United States Patent
Inagaki et al.

(10) Patent No.: US 9,618,385 B2
(45) Date of Patent: Apr. 11, 2017

(54) MEASURING APPARATUS, MEASURING SYSTEM AND MEASURING METHOD

(71) Applicant: KYOCERA CORPORATION, Kyoto (JP)

(72) Inventors: Tomohiro Inagaki, Kanagawa (JP); Yoichi Hirata, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 48 days.

(21) Appl. No.: 14/355,542

(22) PCT Filed: May 17, 2013

(86) PCT No.: PCT/JP2013/003153
§ 371 (c)(1),
(2) Date: Apr. 30, 2014

(87) PCT Pub. No.: WO2013/172039
PCT Pub. Date: Nov. 21, 2013

(65) Prior Publication Data
US 2014/0283614 A1    Sep. 25, 2014

(30) Foreign Application Priority Data

May 18, 2012 (JP) .................................. 2012-114894
Jul. 13, 2012 (JP) .................................. 2012-158140
(Continued)

(51) Int. Cl.
*H04M 1/24* (2006.01)
*G01H 1/04* (2006.01)
(Continued)

(52) U.S. Cl.
CPC ................ *G01H 1/04* (2013.01); *H04M 1/24* (2013.01); *H04R 25/30* (2013.01); *H04R 25/70* (2013.01);
(Continued)

(58) Field of Classification Search
CPC  G01H 17/00; G01H 1/12; G01H 3/00; G01H 1/04; G01H 1/00; G01H 17/12;
(Continued)

(56) References Cited

U.S. PATENT DOCUMENTS 3,019,307 A *  1/1962  Weiss ..................... H04R 25/30
                                                          381/326
5,624,377 A *  4/1997  Davis ....................... G01H 1/00
                                                          600/25
(Continued)

FOREIGN PATENT DOCUMENTS

CN        101662719 A      3/2010
EP          2129169 A2    12/2009
(Continued)

OTHER PUBLICATIONS

The extended European search report issued by the European Patent Office on Jun. 19, 2015, which corresponds to European Patent Application No. 14194431.4-1910 and is related to U.S. Appl. No. 14/355,542.
(Continued)

*Primary Examiner* — Davetta W Goins
*Assistant Examiner* — Oyesola C Ojo
(74) *Attorney, Agent, or Firm* — Studebaker & Brackett PC

(57) ABSTRACT

Provided is a measuring apparatus capable of measuring a vibration amount weighted with characteristics of vibration transmission to a human ear and capable of evaluating correctly an electronic device having a vibrator.

A measuring apparatus 10 configured to evaluate an electronic device 100 that transmits vibration sound to a human ear by pressing a vibrator 102 held in a housing 101 thereto, including an ear simulator 50 that mimics a human ear, and
(Continued)

a vibration detection unit 55 disposed on a periphery 52 of an artificial ear canal 53 formed in the ear simulator 50.

18 Claims, 26 Drawing Sheets

(30) Foreign Application Priority Data

| Jul. 13, 2012 | (JP) | 2012-158141 |
|---|---|---|
| Jul. 30, 2012 | (JP) | 2012-168859 |
| Jul. 30, 2012 | (JP) | 2012-168868 |
| Sep. 14, 2012 | (JP) | 2012-202684 |

(51) Int. Cl.
*H04R 29/00* (2006.01)
*H04R 25/00* (2006.01)
*G01H 17/00* (2006.01)
*G01H 1/12* (2006.01)
*G01M 7/06* (2006.01)
*G01M 7/02* (2006.01)

(52) U.S. Cl.
CPC ............ *H04R 29/00* (2013.01); *G01H 1/12* (2013.01); *G01H 17/00* (2013.01); *G01M 7/02* (2013.01); *G01M 7/06* (2013.01); *H04R 2460/13* (2013.01)

(58) Field of Classification Search
CPC ........ H04R 25/70; H04R 25/30; H04R 29/00; H04R 2460/13; H04R 1/46; H04R 29/001; H04R 2499/11; H04M 1/24; G01R 31/3181; G01R 31/31905; G01R 31/31908; G01R 31/3191; G01R 35/00; G10H 5/00; G01D 1/00; G01M 7/02; G01M 7/06
USPC .......... 381/60, 71.6, 326; 73/1.01, 570, 585, 73/587, 1.82, 649, 662, 663; 702/85, 103, 702/108–112
See application file for complete search history.

(56) References Cited

U.S. PATENT DOCUMENTS

| 5,771,298 | A | * | 6/1998 | Davis | H04R 25/30 |
| | | | | | 381/151 |
| 8,144,885 | B2 | | 3/2012 | Pan | |
| 2003/0065276 | A1 | | 4/2003 | Akita | |
| 2008/0056518 | A1 | | 3/2008 | Burrows et al. | |
| 2009/0028356 | A1 | * | 1/2009 | Ambrose | H04R 1/1091 |
| | | | | | 381/71.6 |
| 2009/0299215 | A1 | | 12/2009 | Zhang | |
| 2010/0054487 | A1 | | 3/2010 | Pan | |
| 2010/0092001 | A1 | * | 4/2010 | Saltykov | H04R 25/70 |
| | | | | | 381/60 |
| 2011/0098551 | A1 | | 4/2011 | Zhang | |
| 2011/0110528 | A1 | | 5/2011 | Latzel | |
| 2011/0164757 | A1 | | 7/2011 | Sibbald et al. | |
| 2011/0183664 | A1 | * | 7/2011 | Topaltzas | H04M 1/24 |
| | | | | | 455/425 |
| 2012/0088215 | A1 | * | 4/2012 | Bellezzo | G09B 23/36 |
| | | | | | 434/270 |
| 2013/0039520 | A1 | * | 2/2013 | Margolis | H04R 29/001 |
| | | | | | 381/326 |

FOREIGN PATENT DOCUMENTS

| EP | 2320679 | A2 | 5/2011 |
| GB | 2456846 | A | 7/2009 |
| JP | S58-198338 | A | 11/1983 |
| JP | H03-168000 | A | 7/1991 |
| JP | 06-038359 | U | 5/1994 |
| JP | H08-159929 | A | 6/1996 |
| JP | H10-126896 | A | 5/1998 |
| JP | 11-500284 | A | 1/1999 |
| JP | H11-41683 | A | 2/1999 |
| JP | 2003-222553 | A | 8/2003 |
| JP | 2003-309899 | A | 10/2003 |
| JP | 2005-348193 | A | 12/2005 |
| JP | 2008-092313 | A | 4/2008 |
| JP | 2014-020848 | A | 2/2014 |
| JP | 2014-020849 | A | 2/2014 |
| WO | 2004/092700 | A2 | 10/2004 |
| WO | 2005/125281 | A1 | 12/2005 |

OTHER PUBLICATIONS

An Office Action; "Notice of Reasons for Rejection," issued by the Japanese Patent Office on Dec. 17, 2013, which corresponds to Japanese Patent Application No. 2012-168868 and is related to U.S. Appl. No. 14/355,542; with English language concise explanation.
An Office Action; "Notice of Reasons for Rejection," issued by the Japanese Patent Office on Dec. 17, 2013, which corresponds to Japanese Patent Application No. 2012-168859 and is related to U.S. Appl. No. 14/355,542; with English language concise explanation.
An Office Action; "Notice of Reasons for Rejection," issued by the Japanese Patent Office on Dec. 17, 2013, which corresponds to Japanese Patent Application No. 2012-202684 and is related to U.S. Appl. No. 14/355,542; with English language concise explanation.
International Search Report; PCT/JP2013/003153; Aug. 20, 2013.
The extended European search report issued by the European Patent Office on May 20, 2015, which corresponds to European Patent Application No. 14194428.0-1910 and is related to U.S. Appl. No. 14/355,542.
The extended European search report issued by the European Patent Office on May 20, 2015, which corresponds to European Patent Application No. 14186812.5-1910 and is related to U.S. Appl. No. 14/355,542.
An Office Action; "Notice of Reasons for Rejection," issued by the Japanese Patent Office on Dec. 3, 2013, which corresponds to Japanese Patent Application No. 2012-114894 and is related to U.S. Appl. No. 14/355,542; with English language concise explanation.
An Office Action; "Notice of Reasons for Rejection," issued by the Japanese Patent Office on Dec. 3, 2013, which corresponds to Japanese Patent Application No. 2012-158141 and is related to U.S. Appl. No. 14/355,542; with English language concise explanation.
An Office Action; "Notice of Reasons for Rejection," issued by the Japanese Patent Office on Dec. 3, 2013, which corresponds to Japanese Patent Application No. 2012-158140 and is related to U.S. Appl. No. 14/355,542; with English language concise explanation.
The extended European search report issued by the European Patent Office on Jan. 29, 2016, which corresponds to European Patent Application No. 13791528.6-1910 and is related to U.S. Appl. No. 14/355,542.
The extended European search report issued by the European Patent Office on May 21, 2015, which corresponds to European Patent Application No. 14186822.4-1910 and is related to U.S. Appl. No. 14/355,542.

\* cited by examiner

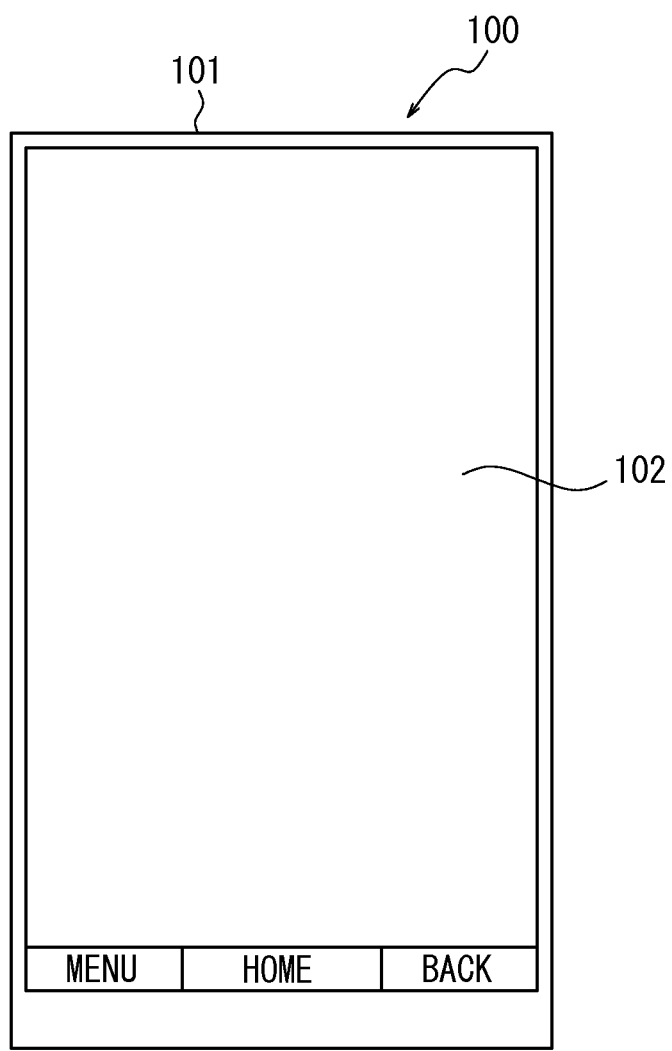

MEASURING APPARATUS, MEASURING SYSTEM AND MEASURING METHOD

CROSS REFERENCE TO RELATED APPLICATION

This application claims priority to and the benefit of Japanese Patent Application Nos. 2012-114894 filed on May 18, 2012, 2012-158140 and 2012-158141 filed on Jul. 13, 2012, 2012-168859 and 2012-168868 filed on Jul. 30, 2012, and 2012-202684 filed on Sep. 14, 2012, the entire contents of which are incorporated herein by reference.

TECHNICAL FIELD

The present invention relates to a measuring apparatus and a measuring system configured to measure and evaluate an electronic device that transmits sound based on vibration of a vibrator to a user by pressing the vibrator held in a housing to the user's ear, and a measuring method thereof.

BACKGROUND

Patent Literature 1 describes an electronic device such as a mobile phone that transmits air conduction sound and bone conduction sound to the user. Also, Patent Literature 1 describes that air conduction sound is sound transmitted to the user's auditory nerve when vibration of the air, caused by vibration of an object, passes through the ear canal to the tympanic membrane, and the tympanic membrane vibrates. Patent Literature 1 further states that bone conduction sound is transmitted to the user's auditory nerve through a part of the user's body (e.g. the cartilage of external ear).

In the telephone described in Patent Literature 1, a rectangular flat plate vibrator made of piezoelectric bimorph and flexible substance is attached to the external surface of a housing through an elastic member. Also, Patent Literature 1 states that, when a voltage is applied to the piezoelectric bimorph of the vibrator, the piezoelectric material expands and contracts in the longitudinal direction, which causes the vibrator to vibrate, and when the user puts the vibrator to his/her auricle, air conduction sound and bone conduction sound are transmitted to the user.

CITATION LIST

Patent Literature 1: JP2005348193A

SUMMARY

The measuring apparatus according to the present invention is a measuring apparatus configured to evaluate an electronic device that transmits the sound to the user through vibration transmission by pressing a vibrator held in a housing to the user's ear, and includes an ear simulator that mimics a human ear and a vibration detection unit disposed on a periphery of an artificial ear canal formed in the ear simulator.

BRIEF DESCRIPTION OF DRAWINGS

FIG. 2 is a plan view illustrating an example of an electronic device to be measured;

DESCRIPTION OF EMBODIMENTS

Figure 1:
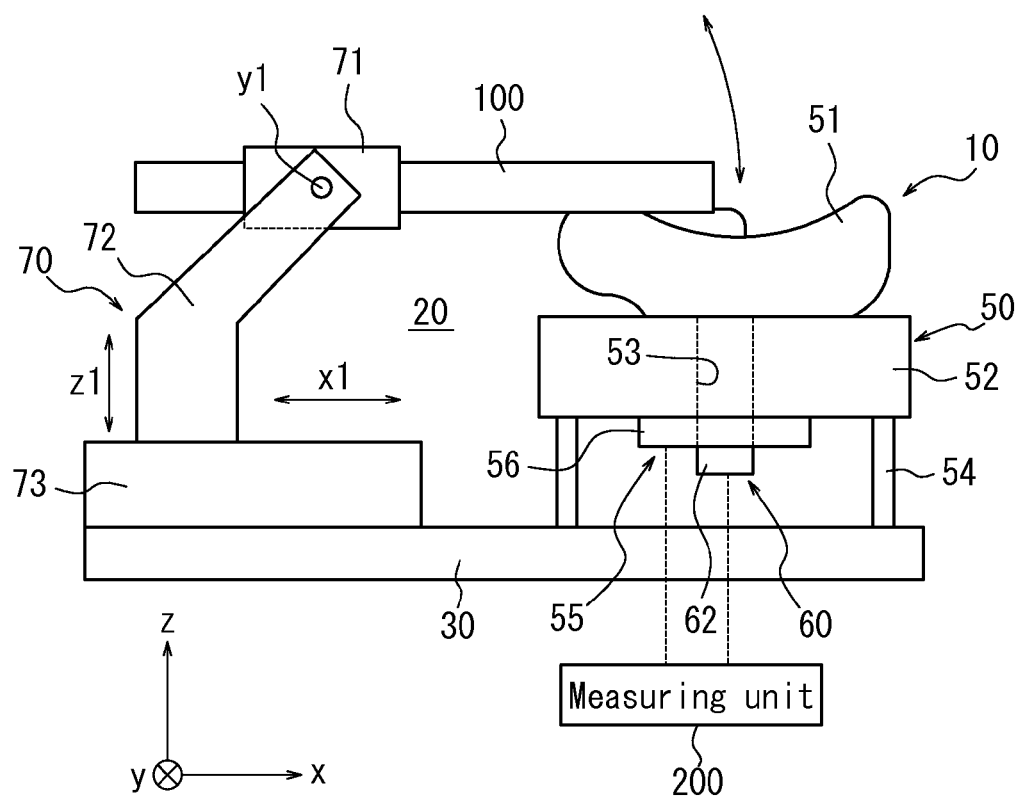
FIG. 1 is a drawing illustrating a schematic configuration of a measuring apparatus according to a first embodiment.

The inventors have developed a mobile phone that, unlike the telephone described in Patent Literature 1, transmits sound by using air conduction sound generated when a panel such as a display panel and a protection panel and the like disposed on the surface of the mobile phone is vibrated, and vibration sound, which is sound component by vibration transmitted when a vibrating panel is put to a human's ear. Then, the inventors have come to think that, in order to appropriately evaluate an electronic device that transmits some kinds of sound through vibration, such as the telephone described in Patent Literature 1 and the mobile phone being developed by the inventors, it is preferred that how much sensible sound pressure, which is a synthesis of sound pressure and vibration amount, is transmitted through vibration of a vibrator be measured by approximating to a human body as much as possible. The inventors have come to think that, it is preferred that at least a sensible sound pressure by vibration be measured by approximating to a human body.

However, a measuring method of measuring the sound pressure and the vibration amount transmitted to a human body through the vibration of a vibrator, that is, a sensible sound pressure, which is a synthesis of the air conduction sound and the bone conduction sound, has not been proposed so far. As a measuring method of the vibration amount, the following two measuring methods are commonly known. In the first measuring method, a vibrator to be measured is pressed to an artificial mastoid for measuring a bone conduction vibrator that mechanically mimics the mastoid behind the ear to measure the vibration amount as a voltage. In the second measuring method, for example, a vibration pickup such as a piezoelectric type accelerometer pickup is pressed to a vibrator to be measured to measure the vibration amount as a voltage.

However, a measured voltage obtained from the above-described first measuring method is a voltage mechanically weighted with human body characteristics when a vibrator is pressed to the mastoid behind the ear, and not a voltage weighted with vibration transmission characteristics when a vibrator is pressed to a human ear. Further, a measured voltage obtained from the above-described second measuring method is the vibration amount of a vibrator that is measured directly from a vibrating object, and also is not a voltage weighted with characteristics of vibration transmission to a human ear. Thus, even if the vibration amount of a vibrator is measured by these measuring method, the vibration amount transmitted by an electronic device to a human body cannot be evaluated correctly.

According to the present invention, a vibration amount weighted with characteristics of vibration transmission to a human ear can be measured, thereby allowing a correct evaluation of an electronic device having a vibrator.

Embodiments of the present invention are described below with reference to the accompanying drawings.

First Embodiment

FIG. 1 is a diagram illustrating a schematic configuration of a measuring apparatus according to a first embodiment. The measuring apparatus 10 according to the present embodiment includes an electronic device mounting unit 20 and a measuring unit 200. Note that the measuring apparatus 10 may be configured by integrating the electronic device mounting unit 20 and the measuring unit 200, or may be configured as a measuring system in which the electronic device mounting unit 20 and the measuring unit 200 are separated from each other and are connected appropriately. The electronic device mounting unit 20 includes an ear simulator 50 supported by a base 30 and a holder 70 that holds an electronic device 100 to be measured. The measuring unit 200 may be disposed on the base 30 or apart therefrom. Note that, in the following description, the electronic device 100 is, as illustrated in a plan view in FIG. 2, a mobile phone such as a smart phone that includes a rectangular panel 102, which is larger than a human ear, on the surface of a rectangular housing 101, and the panel 102 vibrates as a vibrator. First, configuration of the electronic device mounting unit 20 is described.

The ear simulator 50 is a mimic of a human ear, and includes an ear model 51 and an artificial ear canal unit 52 connected to the ear model 51. The artificial ear canal unit 52 is large enough to cover the ear model 51, and in the middle thereof an artificial ear canal 53 is formed. The ear simulator 50 is supported by the base 30 through supporters 54 on a periphery of the artificial ear canal unit 52.

The ear simulator 50 is made of the same material as that for the average ear models used for HATS (Head And Torso Simulator), KEMAR (Knowles electronics mannequin for acoustics research) and the like, of the human body model, for example, a material conforming to IEC60318-7. Note that these ear models may be processed for use. The material may be formed by material such as rubber with a Shore hardness of 35 to 55. Note that the rubber hardness may be measured in accordance with the International Rubber Hardness Degree (IRHD M method) conforming to, for example, JIS K 6253, ISO 48 and the like. Furthermore, as a hardness measuring apparatus, a fully-automatic type IRHD M method micro size international rubber hardness tester GS680 available from Teclock may preferably be used. Note that, with respect to the ear simulator 50, roughly two to three types with different hardness are prepared by taking the hardness of an ear varying by age into consideration, and these types of ear simulators may be used by replacing one another. The ear simulator may be produced based on the statistical data of the hardness of ear by race such as, for example, the yellow race, the white race, the black race and the like.

The thickness of the artificial ear canal unit 52, that is, the length of the artificial ear canal 53 corresponds to the distance to the tympanic membrane (cochlea) of a human, and is appropriately set in the range of 10 mm to 50 mm, preferably from 20 mm to 40 mm. In the present embodiment, the length of the artificial ear canal 53 is about 30 mm. When the artificial ear canal 53 is provided in this manner, air conduction sound from the inner wall of human ear canal can be reproduced, and thus it is preferred.

In the ear simulator 50, on the end face of the artificial ear canal unit 52 opposite to the ear model 51 side, an vibration detection unit 55 is disposed so that it locates on the periphery of the opening of the artificial ear canal 53. The vibration detection unit 55 detects a vibration amount transmitted through the ear canal unit 52 when the vibrating panel 102 is placed to the ear simulator 50. That is, when the panel 102 is pressed to a human ear, the vibration of the panel 102 directly shakes its inner ear, thus the vibration detection unit 55 detects the vibration amount corresponding to the component that is heard without through the tympanic membrane. The vibration detection unit 55 is configured using, for example, a vibration detection element 56 that has flat output characteristics in the measuring frequency range (e.g. 0.1 kHz to 30 kHz) of the electronic device 100 and can correctly measure even light and subtle vibrations. As a vibration detection element 56 like this, for example, a vibration pickup such as a piezoelectric type accelerometer pickup, for example, the vibration pickup PV-08A from Rion Co. and the like may be used. The vibration detection element 56 is connected to the measuring unit 200.

Figure 3A:
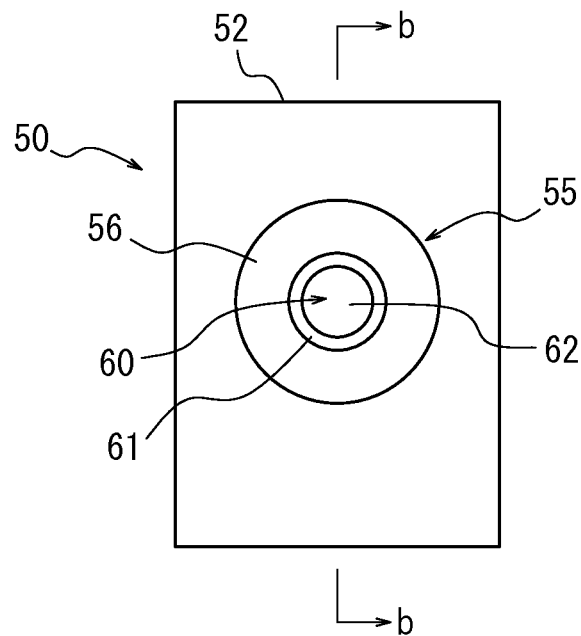
FIGS. 3A and 3B are partial detail diagrams of the measuring apparatus in FIG. 1.

FIG. 3A is a plan view of the ear simulator 50 viewing from the side of base 10. FIG. 3A illustrates a case where a ring-shaped vibration detection element 56 is disposed around the periphery of the opening of the artificial ear canal 53. However, not only one but also more than one vibration detection element 56 may be provided. When a plurality of vibration detection elements 56 are disposed, they may be disposed at appropriate intervals on the periphery of the artificial ear canal 53, or two arc-shaped vibration detection elements may be disposed around the periphery of the opening of the artificial ear canal 53. Note that, in FIG. 3A, although the artificial ear canal unit 52 is formed in a rectangular shape, it may be formed in any shape.

Furthermore, the ear simulator 50 is provided with a sound pressure measuring unit 60. The sound pressure measuring unit 60 measures the sound pressure of sound propagated through the artificial ear canal 53. That is, the sound pressure measuring unit 60 measures the sound pressure corresponding to the air conduction component that is heard directly through the tympanic membrane when the panel 102 is placed to the human ear and the air vibrates through vibration of the panel 102, and the sound pressure corresponding to the air conduction component that is heard through the tympanic membrane when the inside of the ear canal is vibrated by the vibration of the panel 102 and the sound is generated throughout the ear. Note that, if a strong vibration is applied or a vibration of an auricle is not reduced not much when the electronic device 100 lightly presses the auricle (corresponding to an auricle of human ear) of the ear model with about 0.1 N to 1.5 N, the inner wall of the artificial ear canal 53 vibrates, which may generate air conduction component in the artificial ear canal 53, however, the sound pressure measuring unit 60 may also measure such air conduction component generated in this manner.

Figure 3B:
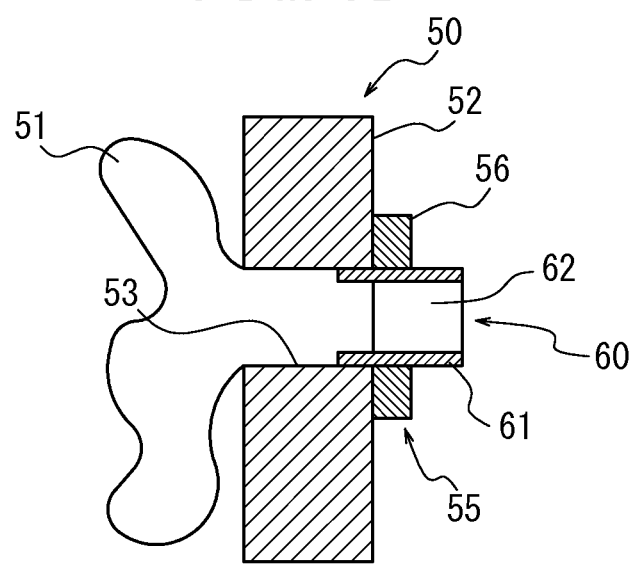

The sound pressure measuring unit 60 is, as illustrated in a cross-sectional view in FIG. 3B taken from the line b-b of FIG. 3A, provided with a microphone 62 held by a tubular member 61 extending from the outer wall (peripheral wall of a hole) of the artificial ear canal 53 through the opening of the ring-shaped vibration detection element 56. The microphone 62 has flat output characteristics in the measuring frequency range of the electronic device 100, for example, and is configured using a condenser microphone for measurement with a low self-noise level. As such a microphone 62, for example, a condenser microphone UC-53A and the like from RION Co. is available. The microphone 62 is disposed so that its sound pressure detection face is aligned with the end face of the artificial ear canal unit 52. Note that the microphone 62 may be supported, for example, by the artificial ear canal unit 52 and the base 10, and disposed in a floating state from the outer wall of the artificial ear canal 53. The microphone 62 is connected to the measuring unit 200.

Next, the holder 70 is described. When the electronic device 100 is a mobile phone, such as a smart phone, formed in a rectangular shape in a planar view, when the user holds the mobile phone with one hand to his/her ear, the user usually supports both sides of the mobile phone by hand. Also, a pressing force and a contact posture to the ear may vary depending on the user, or may change during the use. In the present embodiment, the electronic device 100 is held like a way a mobile phone is used.

Thus, the holder 70 includes a supporter 71 that supports both sides of the electronic device 100. The supporter 71 is attached to one end of an arm 72 so that it can adjustably turn the electronic device 100 about y1 axis parallel to y axis, in the direction of pressing to the ear simulator 50. The other end of the arm 72 is connected to the move adjusting unit 73 provided on the base 30. The move adjusting unit 73 is configured so that it can adjustably move the arm 72 in the up-and-down direction, x1, of the electronic device 100 supported by the supporter 71, which is parallel to x axis perpendicular to y axis, and in the direction, z1, of pressing the electronic device 100 to the ear simulator 50, which is parallel to z axis perpendicular to y axis and x axis.

Thus, in the electronic device 100 supported by the supporter 71, turn of the supporter 71 is adjusted about y1 axis or movement of the arm 72 is adjusted in z1 direction, thereby the pressing force to the ear simulator 50 of the vibrator (panel 102) is adjusted. In the present embodiment, a pressing force is adjusted in the range of 0 N to 10 N, preferably 3 N to 8 N.

Here, the range of 0 N to 10 N is provided to allow measurement in a range much larger than the expected pressing force in the case where the user presses the electronic device to his/her ear for communications and the like. In the case of 0 N, for example, measurement may be made not only when the electronic device is in contact with the ear simulator 50 and is not pressed thereto, but also at each interval of 1 cm increments when the electronic device is held apart from the ear simulator 50. Thus, the degree of attenuation of air conduction sound depending on the distance may be allowed by measuring with the microphone 62, and the convenience as a measuring apparatus is improved. Furthermore, the range of 3 N to 8 N is provided based on the average range of pressing force to the ear when people with normal hearing communicate with each other using a conventional speaker. Basically, in an electronic device such as a smart phone equipped with a conventional type speaker and a conventional mobile phone and the like, it is preferred that, normally, vibration sound and air conduction sound be measured with a pressing force of about the strength applied by a user, which may depend on the race and the sex.

Furthermore, by moving and adjusting the arm 72 in x1 direction, the contact posture of the electronic device 100 to the ear simulator 50 is adjusted to, for example, a posture in which the vibrator (panel 102) covers almost all over the ear simulator 50, or, as illustrated in FIG. 1, a posture in which the vibrator (panel 102) covers a part of the ear simulator 50. Note that, the arm 72 may be configured so that it can be moved and adjusted in the direction parallel to y axis and can adjustably turn about axes parallel respectively to x axis and z axis, and thereby the contact posture of the electronic device 100 to the ear simulator 50 may be adjusted in various postures. Note that, the vibrator is not limited to a panel and the like that covers entire ear, and it may be an electronic device having a protrusion or an angular portion that transmits vibration only to a part of the ear simulator 50, for example, a tragus, which can be a target measured according to the present invention.

Figure 4:
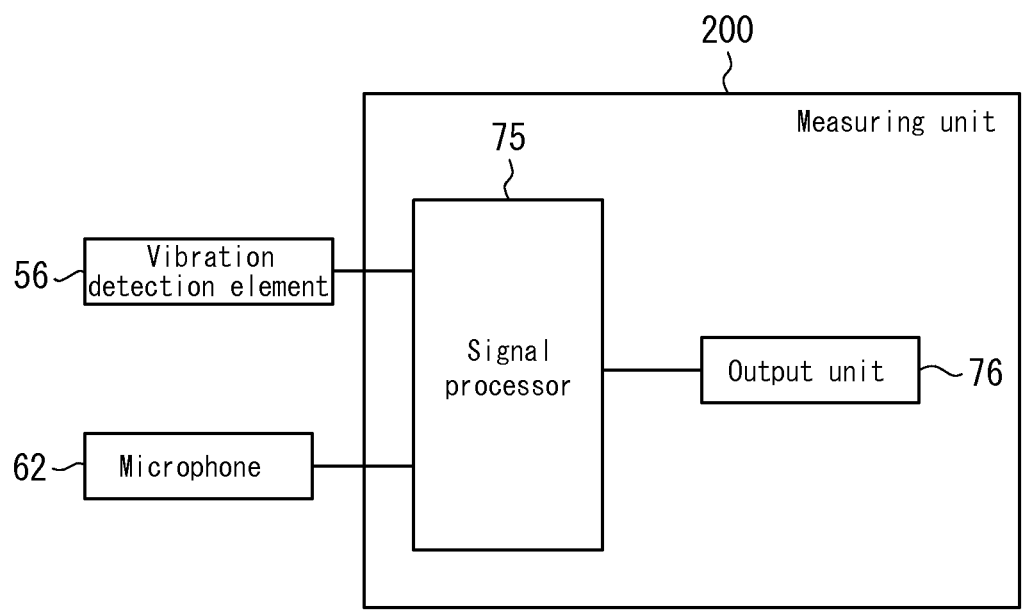
FIG. 4 is a functional block diagram of main parts of the measuring apparatus in FIG. 1.

Next, the measuring unit 200 is described. FIG. 4 is a functional block diagram of main parts of the measuring apparatus 10 according to the present embodiment. The measuring unit 200 includes a signal processor 75 and an output unit 76. The vibration detection element 56 and the microphone 62 are connected to the signal processor 75. The signal processor 75 measures, based on the outputs from the vibration detection element 56 and the microphone 62, the vibration amount through the artificial ear canal unit 52 and the sound pressure through the artificial ear canal 53 by the electronic device 100 respectively. Also, the signal processor 75 measures the audibility based on the measured vibration amount and the sound pressure. These measurement results are output to the output unit 76 such as a display, a printer, a storage and the like and are supplied for an evaluation of the electronic device 100.

Figure 5:
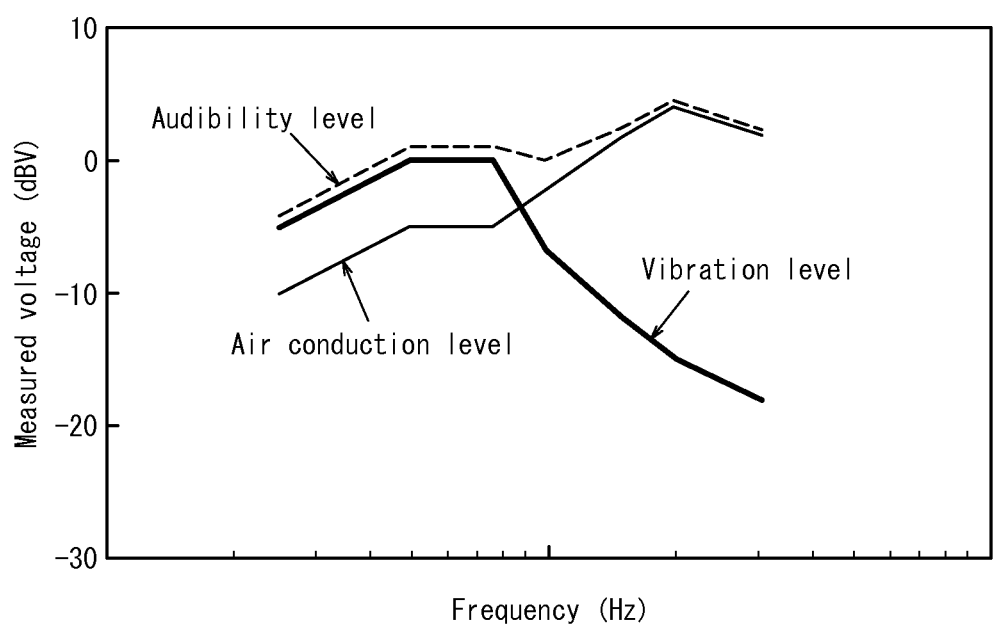
FIG. 5 is a diagram illustrating an example of a measurement result by the measuring apparatus in FIG. 1.
Figure 6:
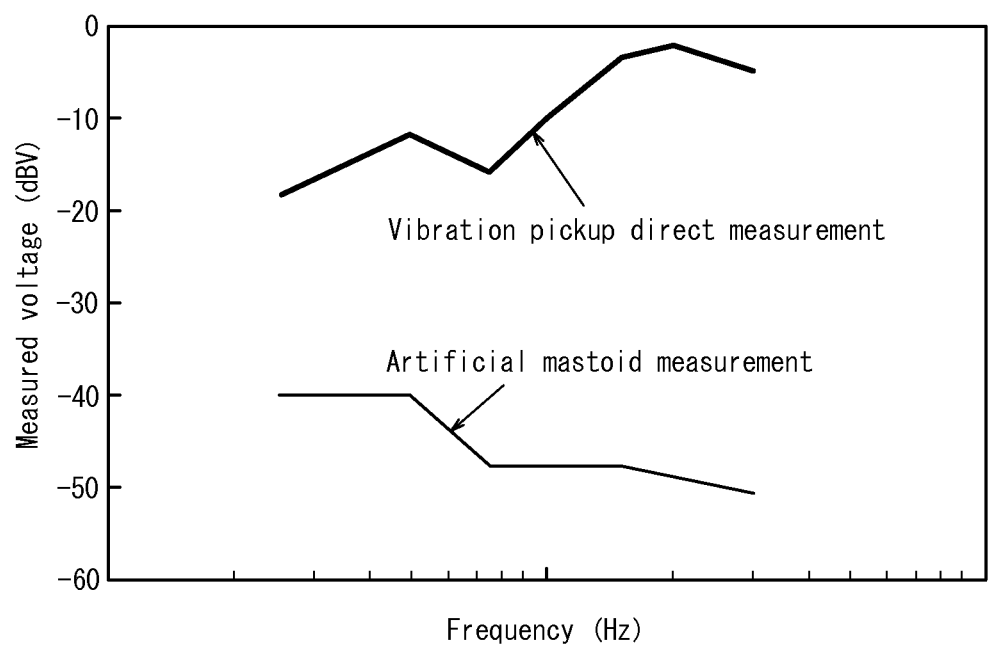
FIG. 6 is a diagram illustrating a measurement result of vibration amount of the same electronic device as that illustrated in FIG. 5 by a conventional method.

FIG. 5 is a diagram illustrating an example of the measurement result by the measuring apparatus 10 according to the present embodiment. FIG. 6 is a diagram illustrating, for comparison, the measurement result of the vibration amount of the electronic device to be measured, which is the same one as illustrated in FIG. 5, by the conventional measuring method. In FIGS. 5 and 6, the horizontal axis represents the acoustic frequency (Hz) and the vertical axis represents the measured voltage (dBV). In FIG. 5, the thick line represents the vibration level, the thin line represents the sound pressure level, and the dashed line represents the audibility level. Also, in FIG. 6, the thick line represents the vibration level measured by pressing a vibration pickup to a vibrator to be measured, and the thin line represents the vibration level measured through an artificial mastoid.

As obvious from FIGS. 5 and 6, when compared with the conventional artificial mastoid method, the vibration level measured by the present embodiment is larger than the measurement level by the artificial mastoid method. Furthermore, when compared with the direct measuring method by the conventional vibration pick up, the vibration level becomes smaller than that measured by the direct measuring method in the frequency range that is greater than a certain value. That is, the vibration level measured according to the present embodiment is weighted with the characteristics of vibration transmission to the human ear.

Thus, according to the measuring apparatus 10 of the present embodiment, the vibration level weighted with the characteristics of vibration transmission to the human ear can be measured, thereby allowing a correct evaluation of the electronic device 100. Moreover, the sound pressure through the artificial ear canal 53 can be measured simultaneously with the vibration level, and thus the audibility level, which is a synthesis of the vibration level corresponding to the vibration transmission amount to the human ear, and the sound pressure level corresponding to the air conduction sound can be measured. Thereby, a more detailed evaluation of the electronic device 100 is enabled. Furthermore, the pressing force to the ear simulator 50 of the electronic device 100 can be changed and the contact posture can be changed as well. Thereby, an evaluation of the electronic device 100 in various aspects is enabled.

Second Embodiment

Figure 7:
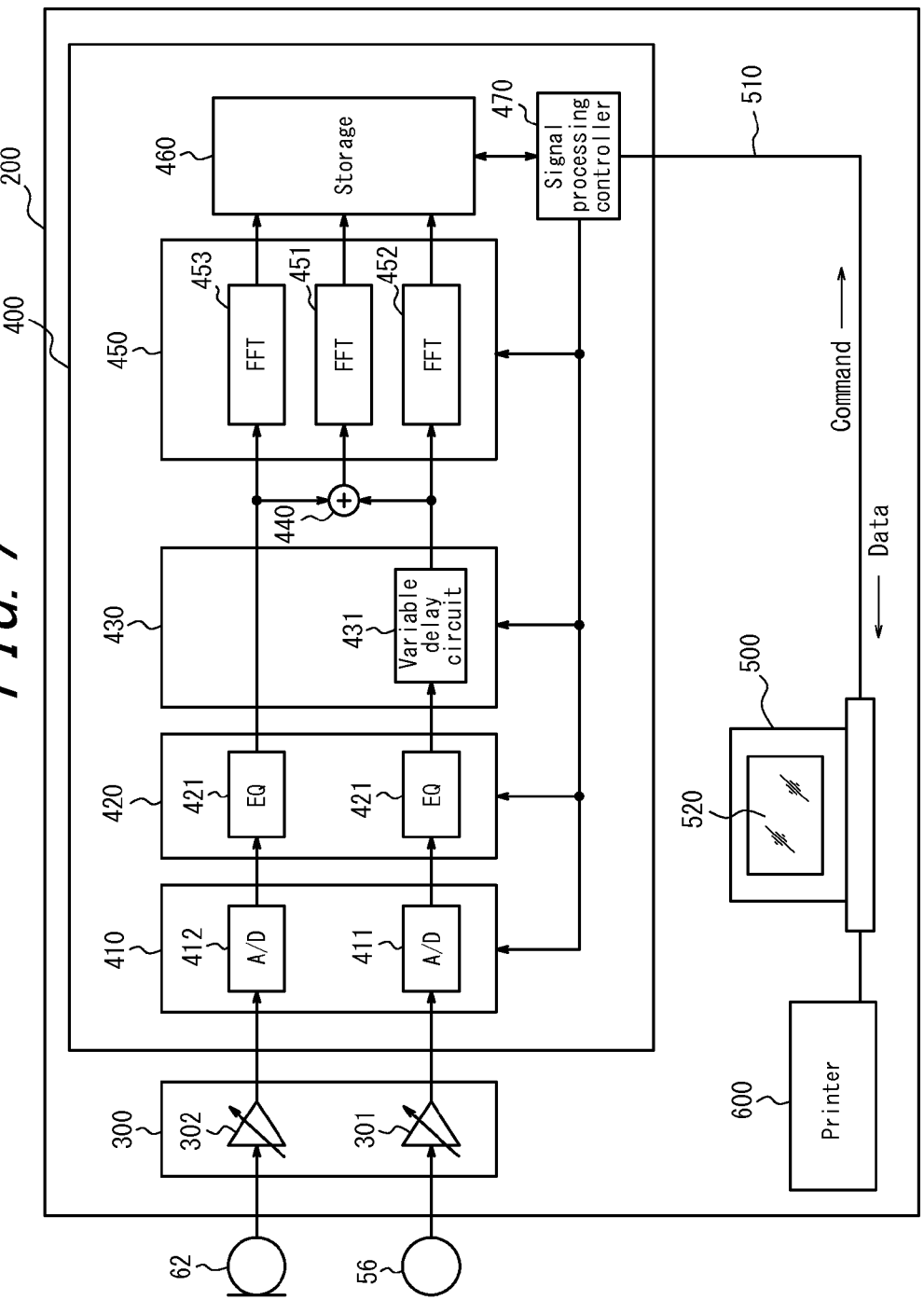
FIG. 7 is a functional block diagram illustrating a configuration of main parts of a measuring unit in a measuring system according to a second embodiment.

Next, a measuring system according to the second embodiment of the present invention is described. The measuring system according to the second embodiment differs from the first embodiment in configuration of the measuring unit 200. FIG. 7 is a functional block diagram illustrating a configuration of main parts of the measuring unit 200 in the measuring system according to the second embodiment. In the present embodiment, the vibration amount and the sound pressure transmitted through the ear simulator 50 by vibration of the electronic device 100 to be measured, that is, the sensible sound pressure, which is a synthesis of the bone conduction sound and the air conduction sound, is measured. The measuring system includes a sensitivity adjusting unit 300, a signal processor 400, a PC (personal computer) 500 and a printer 600.

The outputs from the vibration detection element 56 and the microphone 62 are supplied to the sensitivity adjusting unit 300. The sensitivity adjusting unit 300 includes a variable gain amplifier circuit 301 that adjusts the amplitude of the output from the vibration detection element 56 and a variable gain amplifier circuit 302 that adjusts the amplitude of the output from the microphone 62, and adjusts the amplitude of the analog input signal corresponding to respective circuits, manually or automatically, independently from the required amplitude. Thereby, the error of the sensitivity of the vibration detection element 56 and that of the microphone 62 are corrected. Note that the variable gain amplifier circuits 301 and 302 are configured to allow an adjustment of the amplitude of the input signal, for example, in the range of ±20 dB.

The output from the sensitivity adjusting unit 300 is input to the signal processor 400. The signal processor 400 includes an A/D converter 410, a frequency characteristic adjusting unit 420, a phase adjusting unit 430, an output synthesizing unit 440, a frequency analysis unit 450, a storage 460 and a signal processing controller 470. The A/D converter 410 includes an A/D converting circuit (A/D) 411 that converts the output from the variable gain amplifier circuit 151 into digital signal and an A/D converting circuit (A/D) 412 that converts the output from the variable gain amplifier circuit 152 into digital signal, and converts the analog input signals corresponding to respective circuits into digital signals. Note that the A/D converting circuits 411 and 412 may correspond, for example, to 16 bits or more, which is 96 dB or more in dynamic range. Furthermore, the A/D converting circuits 411 and 412 may be configured to allow a change of dynamic range.

The output from the A/D converter 410 is supplied to the frequency characteristic adjusting unit 420. The frequency characteristic adjusting unit 420 includes an equalizer (EQ) 421 that adjusts the frequency characteristics of the signal detected by the vibration detection element 56, which is the output from the A/D converting circuit 411, and an equalizer (EQ) 422 that adjusts the frequency characteristics of the signal detected by the microphone 62, which is the output from the A/D converting circuit 412, and adjusts, manually or automatically, the frequency characteristics of the respective input signals independently to the frequency characteristics that are close to the human audibility. Note that the equalizers 421 and 422 are configured using, for example, a multi-band graphic equalizer, a low pass filter, a high pass filter and the like. Note that the equalizer (EQ) and the A/D converting circuit may be disposed in a reverse order.

The output from the frequency characteristic adjusting unit 420 is supplied to the phase adjusting unit 430. The phase adjusting unit 430 includes a variable delay circuit 431 that adjusts the phase of the signal detected by the vibration detection element 56, which is the output from the equalizer 421. That is, the sonic speed transmitting through the material of the ear simulator 50 and that transmitting through human muscle and bone are not exactly the same, and thus it is assumed that the phase relation between the output from the vibration detection element 56 and that from the microphone 62 may differ from that in case of the human ear, especially at high frequencies.

Figure 8A:
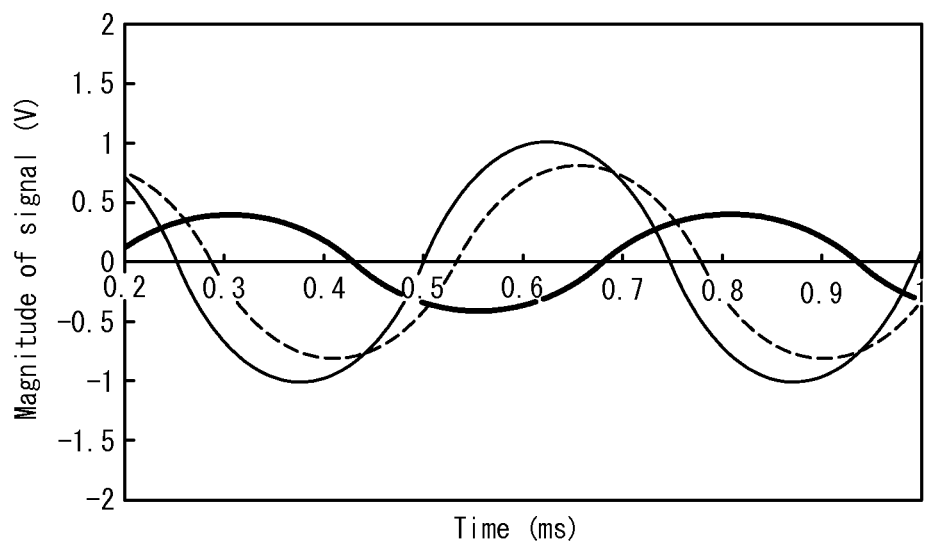
FIGS. 8A and 8B are diagrams illustrating a phase relation between output from a vibration detection element and output from a microphone in FIG. 7.
Figure 8B:
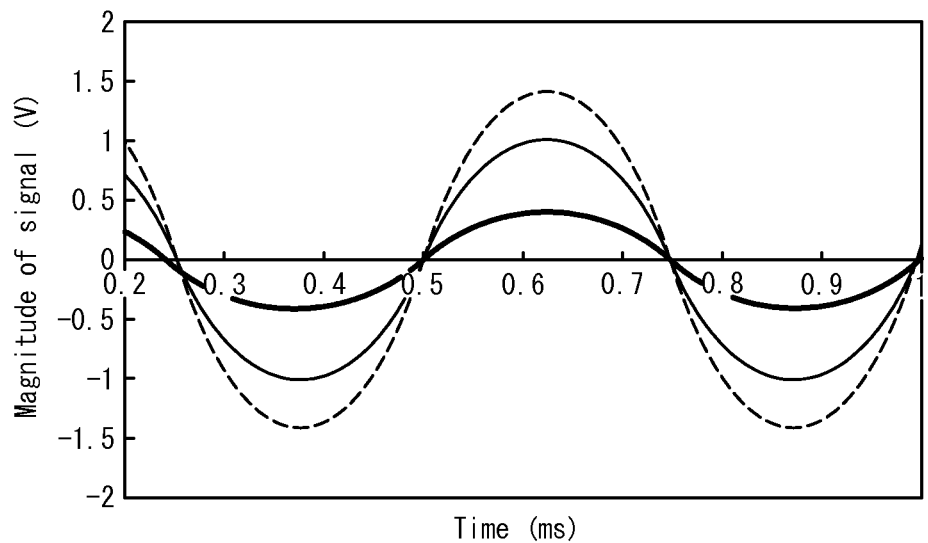

Thus, if the phases between the output from the vibration detection element 56 and that from the microphone 62 are shifted greatly, when both outputs are synthesized by the output synthesizing unit 440 described later, amplitude peaks and dips may appear at values different from the actual case, or the synthesized output may increase or decrease. For example, when the transmission speed of the sound detected by the microphone 62 is delayed by 0.2 ms with respect to the transmission speed of the vibration detected by the vibration detection element 56, the synthesized output thereof sine wave oscillation of 2 kHz is as illustrated in FIG. 8A. On the other hand, when there is no difference between the transmission speeds thereof, the synthesized output is as illustrated in FIG. 8B, in which vibration peaks and dips appear at extraordinary timings. Note that, in FIGS. 8A and 8B, the thick line represents the vibration detection waveform by the vibration detection element 56, the thin line represents the sound pressure detection waveform by the microphone 62, and the dashed line represents the synthesized output waveform.

Thus, in the present embodiment, based on the measured frequency range of the electronic device 100 to be measured, the phase of the signal detected by the vibration detection element 56, which is the output from the equalizer 421, is adjusted in a predetermined range by the variable delay circuit 431. For example, when the measured frequency range of the electronic device 100 is 100 Hz to 10 kHz, using the variable delay circuit 431, the phase of the signal detected by the vibration detection element 56 is adjusted in the range of about ±10 ms (equivalent of ±100 Hz), in the unit which is at least smaller than 0.1 ms (equivalent of 10 kHz). Note that, even in the case of a human ear, phase shift occurs between the bone conduction sound and the air conduction sound, and thus the phase adjustment by the variable delay circuit 431 does not mean that phases of signals detected by the vibration detection element 56 and the microphone 62 are matched, and means that phases thereof are allowed to be matched to the actual audibility by the ear.

The output from the phase adjusting unit 430 is supplied to the output synthesizing unit 440. The output synthesizing unit 440 synthesizes the signal, detected by the vibration detection element 56 and whose phase is adjusted by the variable delay circuit 431 and the signal detected by the microphone 62 and passed through the phase adjusting unit 430. Thus, the vibration amount and the sound pressure transmitted through the vibration of the electronic device 100 to be measured, that is, the sensible sound pressure, which is a synthesis of the bone conduction sound and the air conduction sound, can be approximated to the human body.

The synthesized output from the output synthesizing unit 440 is input to the frequency analysis unit 450. The frequency analysis unit 450 includes a FFT (Fast Fourier Transform) 451 that analyzes the frequency of the synthesized output from the output synthesizing unit 440. Thus, the power spectrum data corresponding to the sensible sound pressure (air+bone), which is a synthesis of the bone conduction sound (bone) and the air conduction sound (air) can be obtained from FFT 451.

Furthermore, in the present embodiment, the frequency analysis unit 450 includes FFTs 452 and 453 that perform frequency analysis of the signal before being synthesized by the output synthesizing unit 440, that is, the signal detected by the vibration detection element 56 and passed through the phase adjusting unit 430 and the signal detected by the microphone 62 respectively. Thus, the power spectrum data corresponding to the bone conduction sound (bone) is obtained from FFT452 and the power spectrum data corresponding to the air conduction sound (air) is obtained from FFT 453.

In FFTs 451 to 453, the analysis point of the frequency component (power spectrum) is set based on the measured frequency range of the electronic device 100. For example, when the measured frequency range of the electronic device 100 is 100 Hz to 10 kHz, setting is made so that the frequency component of each point obtained by equally dividing the interval of the measured frequency range in a logarithmic chart into 100 to 200 is analyzed.

The outputs from FFTs 451 to 453 are stored in the storage 460. The storage 460 has a capacity of double buffer or more enough to store a plurality of analysis data (power spectrum data) by each of FFTs 451 to 453. Furthermore, the storage may be configured to allow transmission of the latest data at a timing of data transmission request from PC500 at all times, which is described later.

The signal processing controller 470 is connected to PC500 through a connection cable 510 for the interface such as, for example, USB, RS-232C, SCSI, PC card and the like, and controls operation of each part of the signal processor 400 based on the command from PC500. Note that the signal processor 400 may be configured as software executed on any preferred processor such as CPU (Central Processing Unit), or configured by DSP (Digital Signal Processor).

PC500 includes an evaluation application for the electronic device 100 by the measuring system. The evaluation application is downloaded through, for example, CD-ROM, network and the like. Also, PC500 displays, for example, an application screen based on the evaluation application on a display 520, and sends a command to the signal processor 400 based on the information input through the application screen. Also, PC500 receives a response to a command or the data from the signal processor 400, performs a predetermined processing based on the received data, and displays the measurement result on the application screen, then outputs the measurement result to the printer 600 as necessary.

In FIG. 7, the sensitivity adjusting unit 300 and the signal processor 400 are mounted, for example, on the base 30 of the electronic device mounting unit 20, and PC500 and the printer 600 are disposed apart from the base 30, and the signal processor 400 and PC500 may be connected through a connection cable 510.

Figure 9:
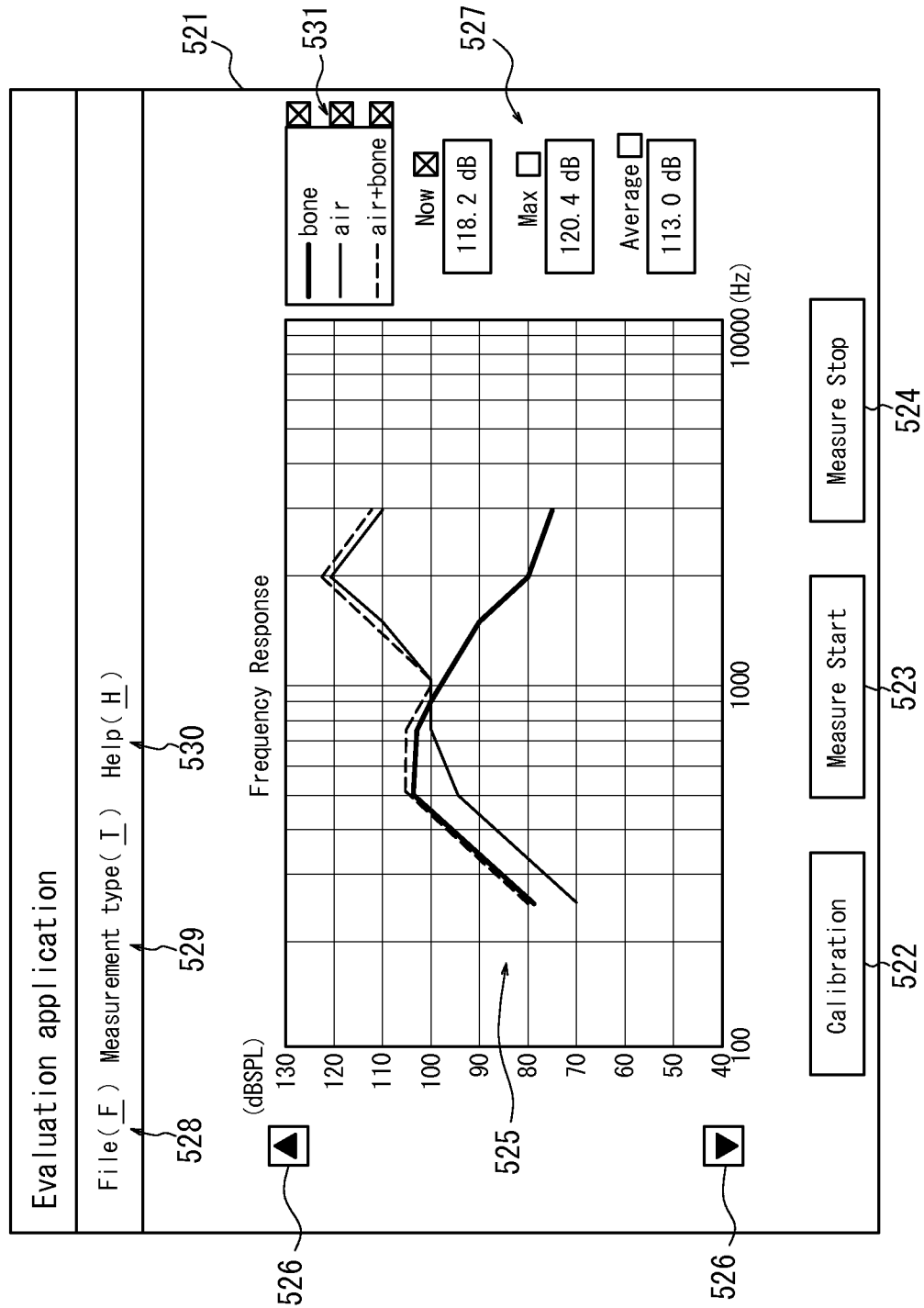
FIG. 9 is a diagram illustrating an example of an application screen and a measurement result by the measuring system in FIG. 7.

FIG. 9 is a diagram illustrating an example of the application screen displayed on the display 520. The application screen 521 illustrated in FIG. 9 includes a "Calibration" icon 522, a "Measure Start" icon 523, a "Measure Stop" icon 524, a measurement result display selection box 531, a measurement result display area 525, a measurement range change icon 526, a measurement result display selection area 527, a file icon 528, a measurement type icon 529 and a help icon 530. Each function is described briefly below.

The "Calibration" icon 522 calibrates errors in sensitivity of the vibration detection element 56 and the microphone 62. In this calibration mode, a standard machine is set to the holder 70 and is placed to the standard position of the ear simulator 50. Then, the sensitivities of the vibration detection element 56 and the microphone 62 are adjusted by the variable gain amplifier circuits 301 and 302 so that, when the standard machine is vibrated in a predetermined vibration mode (e.g. pure tone or multi sine), the power spectrum data of the signal detected by the vibration detection element 56 and the power spectrum data of the signal detected by the microphone 62 are respectively within the corresponding normal error ranges.

The "Measure Start" icon 523 sends a measure start command to the signal processor 400, and keeps receiving data until the measurement is stopped. The "Measure Stop" icon 524 sends a measure stop command to the signal processor 400 and stops receiving data. In the measurement result display area 525, a measurement result corresponding to a measurement mode selected by the measurement type icon 529 based on the received data is displayed. The measurement result display selection box 531 displays a type of measurement result that can be displayed on the measurement result display area 525 and its selection box. FIG. 9 illustrates a case where the measurement results of power spectrum of bone (bone conduction), air (air conduction) and air+bone (sensible sound pressure) in a power spectrum measurement mode are displayed on the measurement result display area 525.

The measurement range change icon 526 shifts the measurement range width of the power spectrum displayed on the measurement result display area 525 up and down in the unit of 10 dB and sends a measurement range change command to the signal processor 400 as well. Thus, the signal processor 400 changes the A/D conversion range of the A/D converting circuits 411 and 412 in response to the measurement range change command.

The measurement result display selection area 527 displays a power spectrum type that can be displayed on the measurement result display area 525 and its selection box, and displays a display area of a current value (Now), a maximum value (Max) during a measurement and an average value (Average) during a measurement of the power spectrum and their selection boxes as well, then with respect to the information selected by the selection box, displays a power spectrum and a high frequency distortion factor on a corresponding area. The file icon 528 prints, for example, the application screen being displayed, and outputs the measurement result in CSV or Excel format. The measurement type icon 529 switches a measurement mode such as a power spectrum measurement mode, a high frequency distortion factor measurement mode and the like. Note that a high frequency distortion factor displayed on the measurement result display selection area 527 can be calculated by PC500, in the high frequency distortion factor mode, based on the measurement data by the signal processor 400. The help icon 530 displays a help for the method of using the measuring system.

The measuring system according to the present embodiment analyzes the frequency component of the synthesized output of the vibration detection element 56 and the microphone 62 while vibrating the panel 102 of the electronic device 100 to be measured by, for example, a piezoelectric element, and evaluates the electronic device 100. Here, the piezoelectric element that vibrates the panel 102 may be driven by a multiple driving signal wave, which is a synthesis of each of driving signals for every 100 Hz in the above-mentioned range of 100 Hz to 10 kHz, for example.

Figure 10:
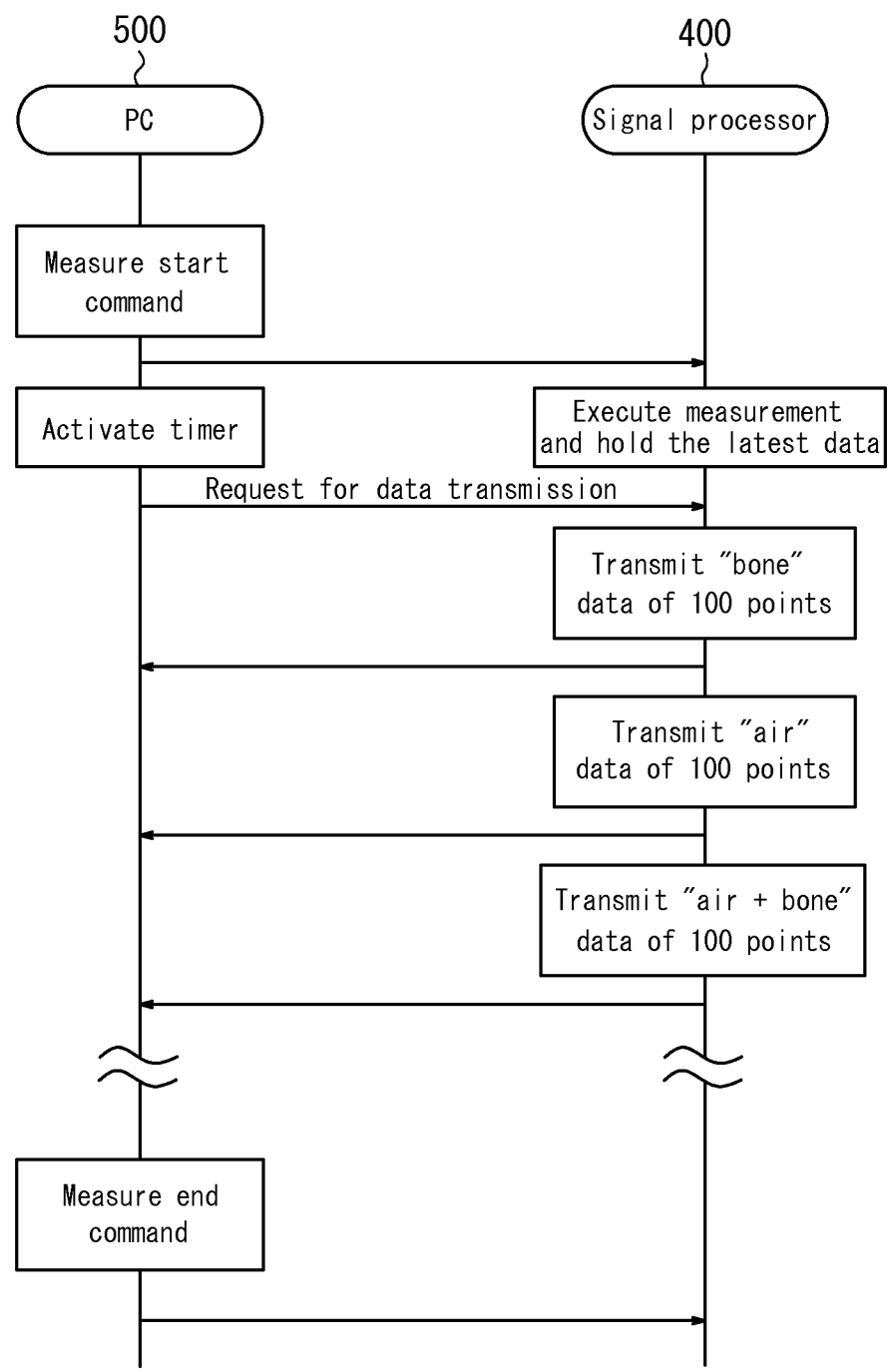
FIG. 10 is a sequence diagram illustrating an example of a measuring operation by the measuring system in FIG. 7.

An example of the measuring operation of the electronic device 100 by the measuring system according to the present embodiment is described below with reference to the sequence diagram illustrated in FIG. 10. Note that, here, "air+bone" data, "bone" data and "air" data of 100 points are obtained respectively by FFTs 451 to 453 of the frequency analysis unit 450.

First, when the "Measure Start" icon 523 on the application screen 521 in FIG. 9 is operated, PC500 sends a measure start command to the signal processor 400. When the signal processor 400 receives the measure start command, it executes a measurement of the electronic device 100. Thus, the signal processor 400 converts the outputs from the vibration detection element 56 and the microphone 62, after the sensitivities of the outputs are adjusted by the sensitivity adjusting unit 300, into digital signals by the A/D converter 410, and further, after the frequency characteristics thereof are adjusted by the frequency characteristic adjusting unit 420, adjusts the phases thereof by the phase adjusting unit 430, then synthesizes the outputs by the synthesizing unit 440. Thereafter, the signal processor 400 analyzes the frequency of the synthesized output from the output synthesizing unit 440 by FFT 451 of the frequency analysis unit 450, and stores the power spectrum data of 100 points, that is, "air+bone" data, in the storage 460.

At the same time, the signal processor 400 analyzes the frequency of the signal, detected by the vibration detection element 56, whose phase is adjusted by the variable delay circuit 431 of the phase adjusting unit 430 by FFT452, and stores the power spectrum data of 100 points, that is, the "bone" data, in the storage 460. In the same manner, the signal processor 400 analyzes the frequency of the signal detected by the microphone 62 and passed through the phase adjusting unit 430 by FFT453, and stores the power spectrum data of 100 points, that is, the "air" data, in the storage 460.

The signal processor 400 repeats the FFT processing by FFTs 451 to 453 at a predetermined timing and stores the results in the storage 460. Thus, the storage 460 sequentially updates the data from FFTs 451 to 453, and stores them, thus holds the latest data all the time.

After that, PC500 activates a timer at a predetermined timing and sends a data transmission request command to the signal processor 400. When the signal processor 400 receives the data transmission request from PC500, it sequentially transmits the latest "bone" data, "air" data and "air+bone" data stored in the storage 460, 100 point each, to PC500.

PC500 sends a data transmission request command to the signal processor 400 on every timer interval elapsed until it sends a measure stop command to the signal processor 400, and obtains the latest "bone" data, "air" data and "air+bone" data. Then, each time PC500 obtains data from the signal processor 400, it displays the measurement result on the application screen 521 in FIG. 9 based on the obtained data.

After that, when the "Measure Stop" icon 524 on the application screen 521 in FIG. 9 is operated, PC500 sends a measure stop command to the signal processor 400. Thus, PC500 and the signal processor 400 stop a measurement operation. Furthermore, the above-described measurement result of the electronic device 100 is output from the printer 600 as necessary during measurement or after measurement of the electronic device 100.

Figure 11:
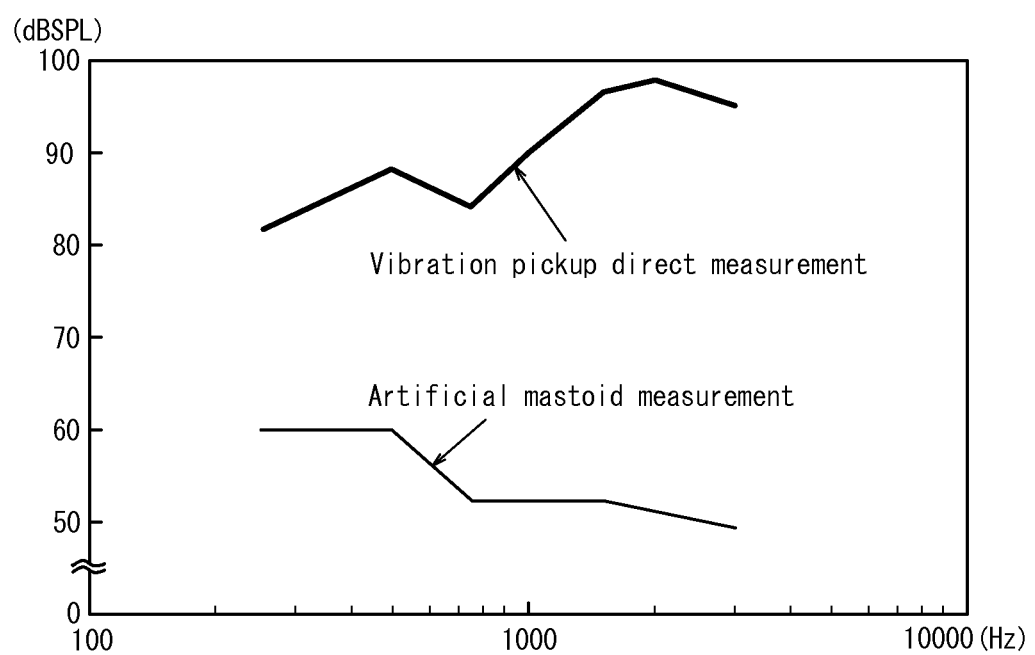
FIG. 11 is a diagram illustrating a measurement result of a vibration amount of the electronic device that obtains the measurement result illustrated in FIG. 9 by a conventional measuring method.

Here, the measurement result by the measuring system according to the present embodiment illustrated in FIG. 9 is described by comparing with the conventional measuring method. FIG. 11 illustrates the power spectrum of the vibration amount of the same electronic device 100 to be measured as that illustrated in FIG. 9, measured by the conventional measuring method. In FIG. 11, the thick line represents the power spectrum measured by pressing the vibration pickup to the vibrator to be measured and the thin line represents the power spectrum measured through the artificial mastoid.

As obvious from FIGS. 9 and 11, in the present embodiment, the power spectrum corresponding to the bone conduction component measured based on the output from the vibration detection element 56 is, compared with the conventional artificial mastoid method, larger than the power spectrum by the artificial mastoid method. Furthermore, compared with the direct measuring method by the conventional vibration pickup, the power spectrum is smaller than the direct measuring method in the frequency band exceeding a certain value. That is, the power spectrum corresponding to the bone conduction component measured according to the present embodiment is weighted with the characteristics of vibration transmission of the human ear.

Also, in the present embodiment, the microphone 62 measures the sound pressure passed through the ear simulator 50. Therefore, the power spectrum corresponding to the air conduction component that is measured based on the output from the microphone 62 is a synthesis of the sound pressure corresponding to the air conduction component that is heard directly via the tympanic membrane when the air is vibrated by the vibration of the electronic device 100, and the sound pressure corresponding to the air conduction component, that is the sound generated by the ear itself when inside the ear canal is vibrated by the vibration of the electronic device 100, heard via the tympanic membrane. That is, the power spectrum corresponding to the air conduction component measured according to the present embodiment is weighted with the characteristics of sound pressure transmission of the human ear.

Moreover, in the measuring apparatus 10 according to the present embodiment, the phase of the output corresponding to the bone conduction component from the vibration detection element 56 and the phase of the output corresponding to the air conduction component from the microphone 62 are adjusted by the phase adjusting unit 430, then both outputs are synthesized by the output synthesizing unit 440, and the frequency of the synthesized output is analyzed by the frequency analysis unit 450. Therefore, the sensible sound pressure, which is a synthesis of the vibration amount and the sound pressure transmitted to the human body through vibration of the electronic device 100 to be measured, can be measured by approximating to the human body, thereby allowing an evaluation of the electronic device 100 at a high accuracy and enhancing the reliability of the measuring system.

Furthermore, in the present embodiment, the frequency analysis unit 450 analyzes the frequency of the output corresponding to the bone conduction component from the vibration detection element 56 and the output corresponding to the air conduction component from the microphone 62 independently, thereby allowing a more detailed evaluation of the electronic device 100. Moreover, the sensitivity adjusting unit 300 adjusts the sensitivity of the vibration detection element 56 and of the microphone 62, thereby allowing a measurement of the sensible sound pressure by age and the like. Therefore, the electronic device 100 can be evaluated depending on the function of each user's ear. Furthermore, the system is configured to allow an adjustment of the frequency characteristics of the output corresponding to the bone conduction component from the vibration detection element 56 and the output corresponding to the air conduction component from the microphone 62 independently by the frequency characteristic adjusting unit 420, thereby allowing a more accurate evaluation of the electronic device 100 depending on the function of each user's ear.

Moreover, the electronic device 100 to be measured can change the pressing force to the ear simulator 50 and the contact posture thereto as well, thereby allowing an evaluation of the electronic device 100 in various aspects.

Third Embodiment

Figure 12:
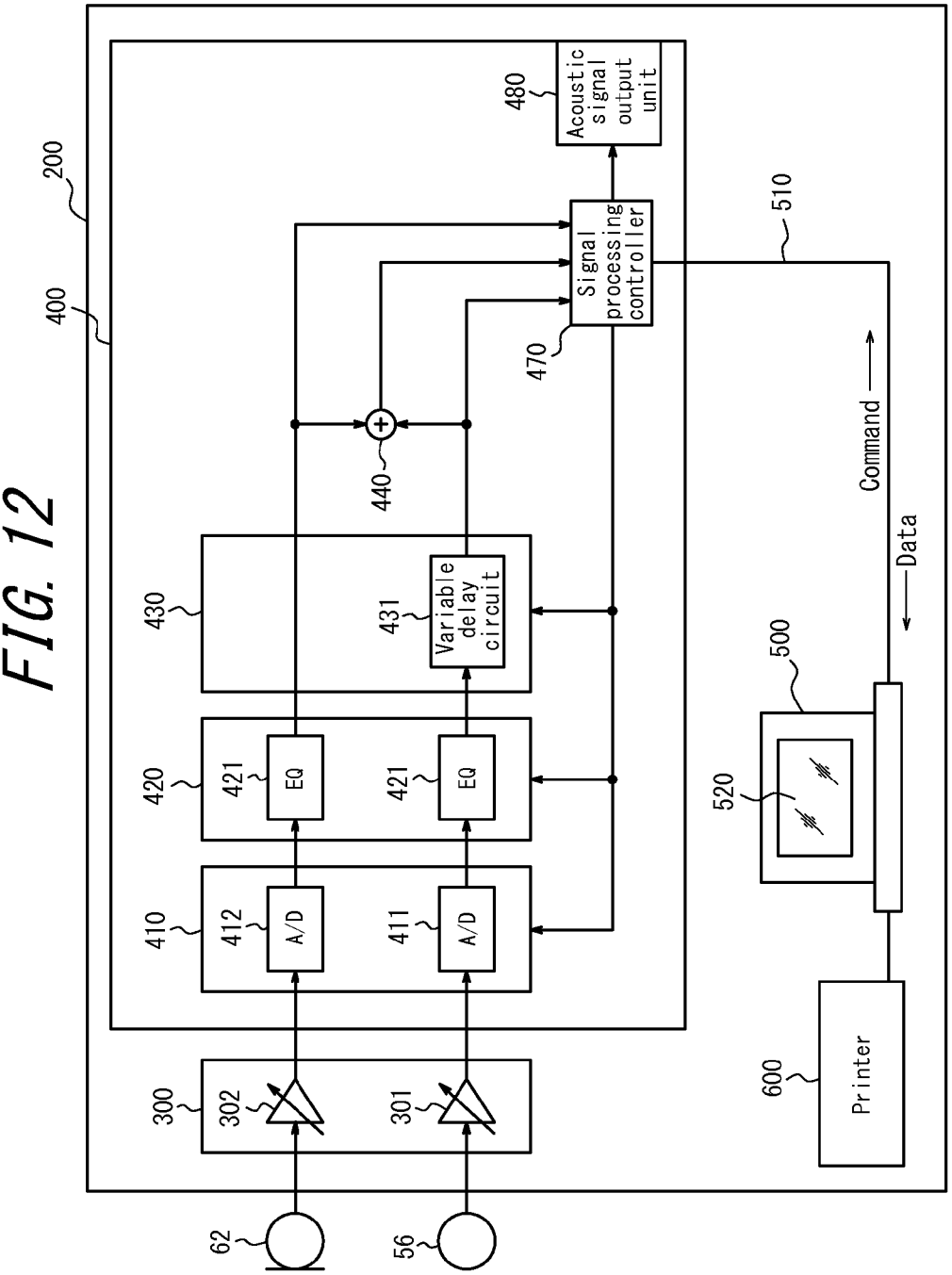
FIG. 12 is a functional block diagram illustrating a configuration of main parts of a measuring unit in a measuring system according to a third embodiment.

Next, a measuring system according to the third embodiment of the present invention is described. The measuring system according to the third embodiment differs from the second embodiment in configuration of the measuring unit 200. FIG. 12 is a functional block diagram illustrating a configuration of main parts of the measuring unit 200 in the measuring system according to the third embodiment. In the measuring unit 200 illustrated in FIG. 12, the frequency analysis unit 450 and the storage 460 of the signal processor 400 are omitted from the configuration illustrated in FIG. 7, and the signal, detected by the vibration detection element 56, whose phase is adjusted by the phase adjusting unit 430, the signal detected by the microphone 62, and the synthesized detection signal, which is a synthesis of both detected signals synthesized by the output synthesizing unit 440, are supplied respectively to the signal processing controller 470.

Furthermore, the signal processor 400 includes an acoustic signal output unit 480. The acoustic signal output unit 480 is configured so that an external connection device such as a headphone and the like can be detachably connected thereto. To the acoustic signal output unit 480, either one of the above-described "air+bone" data, "bone" data and "air" data is selected by the signal processing controller 470, converted into analog acoustic signal and supplied.

Figure 13:
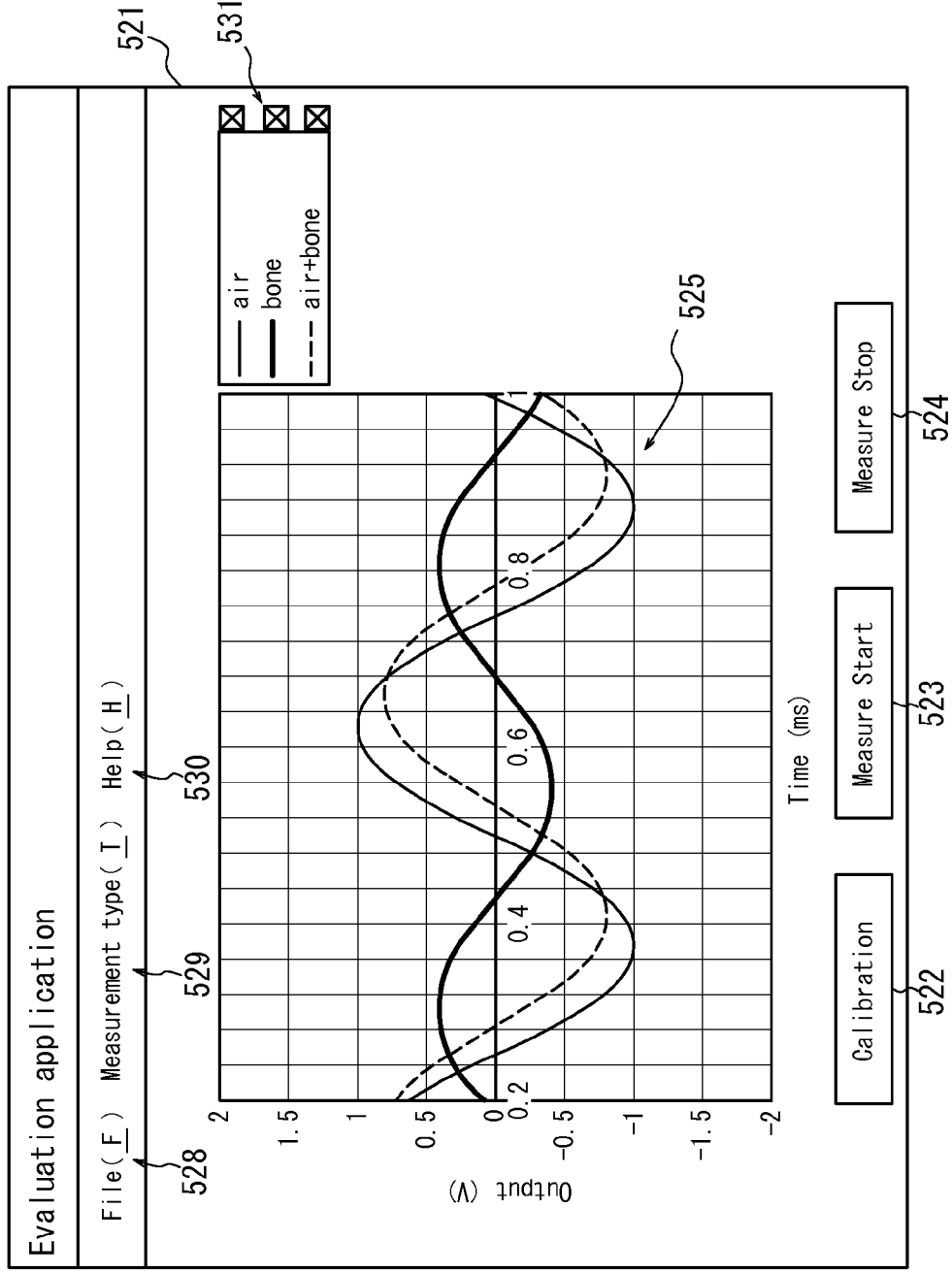
FIG. 13 is a diagram illustrating an example of an application screen and a measurement result by the measuring system in FIG. 12.

FIG. 13 is a diagram illustrating an example of the application screen displayed on the display 520. In the application screen 521 illustrated in FIG. 13, the measurement range change icon 526 and the measurement result display selection area 527 are omitted from the application screen 521 illustrated in FIG. 9, and the time waveforms of the bone (bone conduction), air (air conduction) and air+bone (sensible sound pressure) in the measurement mode selected by the measurement type icon 529 are displayed on the measurement result display area 525.

The measuring system according to the present embodiment measures the synthesized output of the vibration detection element 56 and the microphone 62 while vibrating the panel 102 of the electronic device 100 to be measured by, for example, piezoelectric element and evaluates the electronic device 100. An example of the measurement operation of the electronic device 100 by the measuring system according to the present embodiment is described below.

First, when the "Measure Start" icon 523 on the application screen 521 in FIG. 13 is operated, PC500 sends a measure start command to the signal processor 400. When the signal processor 400 receives the measurement start command, it executes a measurement of the electronic device 100. Thus, the signal processor 400 converts the outputs from the vibration detection element 56 and the microphone 62, after the sensitivities thereof are adjusted by the sensitivity adjusting unit 300, into digital signals by the A/D converter 410, adjusts the frequency characteristics by the frequency characteristic adjusting unit 420, and adjusts the phase by the phase adjusting unit 430, then synthesizes the outputs by the output synthesizing unit 440.

Then, the signal processor 400 transmits the output synthesized by the output synthesizing unit 440 to PC500, converts it into analog and outputs to the acoustic signal output unit 480 as well. Also, the signal processor 400 transmits, as necessary, the signals detected by the vibration detection element 56 and by the microphone 62 and not yet synthesized by the output synthesizing unit 440 to PC500. Then, PC500 displays time waveforms of each of the output synthesized by the output synthesizing unit 440 and transmitted from the signal processor 400, the signals detected by the vibration detection element 56 and by the microphone 62 and not yet synthesized by the output synthesizing unit 440 respectively on the display 520, which allows an evaluation of the electronic device 100 to be measured based on the time waveforms displayed on the display 520.

Then, when the "Measure Stop" icon 524 on the application screen 521 in FIG. 13 is operated, PC500 sends a measure stop command to the signal processor 400, and thus PC500 and the signal processor 400 end a measurement operation. Furthermore, the above-described measurement result of the electronic device 100 is output from the printer 600 as necessary during or after the measurement of the electronic device 100.

According to the measuring system of the present embodiment, the vibration amount corresponding to the bone conduction component measured based on the output from the vibration detection element 56 is weighted with characteristics of the vibration transmission of the human ear. Furthermore, the sound pressure corresponding to the air conduction component measured based on the output from the microphone 62 is a synthesis of the sound pressure corresponding to the air conduction component that is heard directly via the tympanic membrane when the air is vibrated by the vibration of the electronic device 100 and the sound pressure corresponding to the air conduction component, which is the sound generated by the ear itself with inside the ear canal being vibrated by the vibration of the electronic device 100, heard via the tympanic membrane. That is, the sound pressure corresponding to the air conduction component measured according to the present embodiment is weighted with the characteristics of sound transmission of the human ear.

Moreover, the output corresponding to the bone conduction component from the vibration detection element 56 and the output corresponding to the air conduction component from the microphone 62 are synthesized by the output synthesizing unit 440 after their phases are adjusted by the phase adjusting unit 430. Therefore, the sensible sound pressure, which is a synthesis of the vibration amount and the sound pressure transmitted to the human body through vibration of the electronic device 100 to be measured can be measured by approximating to the human body. Thereby, an evaluation of the electronic device 100 at a high accuracy and enhancing the reliability of the measuring system is enabled.

Here, a phase adjustment by the phase adjusting unit 430 may be performed following the procedures described below. First, a standard machine is set in the holder 70 of the measuring system and is placed to the standard position of the ear simulator 50. Then, the standard machine is vibrated and a pure sound is generated while gradually increasing the frequency from 1 kHz, and the synthesized output ("air+bone" data) by the output synthesizing unit 440 at that time is measured, then the time waveform thereof is confirmed by the display 520. Note that, instead of observation of the time waveform, or with observation of the time waveform, a headphone may be connected to the acoustic signal output unit 480 to listen to the sound of the synthesized output. With this measurement, the propagation speed of the sound propagated in the air is different from that of the sound propagated in the ear simulator 50, and thus a phase shift occurs between the waveform of the air conduction component and that of the bone conduction component. As a result thereof, at a certain frequency, phases of the air conduction component and the bone conduction component become in-phase or anti-phase, resulting in a rapid change in the synthesized signal.

Next, the standard machine is placed to the ear of the operator and is vibrated at a frequency at which a rapid change has occurred. Then, whether or not the loudness of the sound changes in the same manner as the time waveform measured by the measuring system is confirmed. As a result thereof, if the same phenomenon is not felt in auditory sensation, it indicates that the phase relation between the air conduction component and the bone conduction component of the measuring system is not matched with the phase relation between the air conduction component and the bone conduction component of the actual ear. Thus the phase of the bone conduction component is shifted by the variable delay circuit 431 of the phase adjusting unit 430 and the phase relation between both components is adjusted to obtain the same phenomenon. Thus, the phase relation between the air conduction component and the bone conduction component of the measuring system is calibrated to match to the phase relation between the air conduction component and the bone conduction component of the actual ear, thereby significantly enhancing the reliability of the measuring system when the electronic device 100 to be measured is measured.

Moreover, in the present embodiment, the acoustic signal output unit 480 to which a headphone can be connected is provided, thus there is an advantage in that development of an electronic device provided with a high-power piezoelectric receiver is facilitated. That is, since a piezoelectric receiver does not generate a sound unless it is placed to an ear, a developer needs, when a high-power piezoelectric receiver is developed, to adjust the sound while hearing the sound pressure that can barely be heard by a person with normal hearing for development. In this case, if a headphone can be connected to the acoustic signal output unit 480 and sound can be heard through the headphone, the acoustic quality of the piezoelectric receiver can be evaluated safely.

Furthermore, in the present embodiment, the output corresponding to the bone conduction component from the vibration detection element 56 and the output corresponding to the air conduction component from the microphone 62 can be measured independently before they are synthesized by the output synthesizing unit 440, thereby allowing a more detailed evaluation of the electronic device 100. Moreover, the sensitivity of the vibration detection element 56 and of the microphone 62 is adjusted by the sensitivity adjusting unit 300, thereby allowing a measurement of the sensible sound pressure depending on the age and the like. Therefore, the electronic device 100 can be evaluated depending on the function of each individual's ear. In addition, the frequency characteristic adjusting unit 420 allows an adjustment of the frequency characteristics of the output corresponding to the bone conduction component from the vibration detection element 56 and of the output corresponding to the air conduction component from the microphone 62 independently, thereby allowing an evaluation of the electronic device 100 at a high accuracy depending on the function of each individual's ear.

Also, in the electronic device 100 to be measured, the pressing force to the ear simulator 50 can be changed and the contact posture can be changed as well, thereby allowing an evaluation of the electronic device 100 in various aspects.

Fourth Embodiment

Next, a measuring apparatus according to the fourth embodiment of the present invention is described. In the measuring apparatus according to the fourth embodiment, in the above-described embodiment, on the periphery of the artificial ear canal unit 52, the ear simulator 50 is detachably supported by the base 30 through the supporters 54. Also, the vibration detection unit 55 having the vibration detection element 56 is disposed, on the end face opposite to the ear model 51 side of the artificial ear canal unit 52, detachably to the ear simulator 50, so that it locates on the periphery of the opening of the artificial ear canal 53. Furthermore, the sound pressure measuring unit 60 having the microphone 62 is detachably disposed to the ear simulator 50.

Figure 14A:
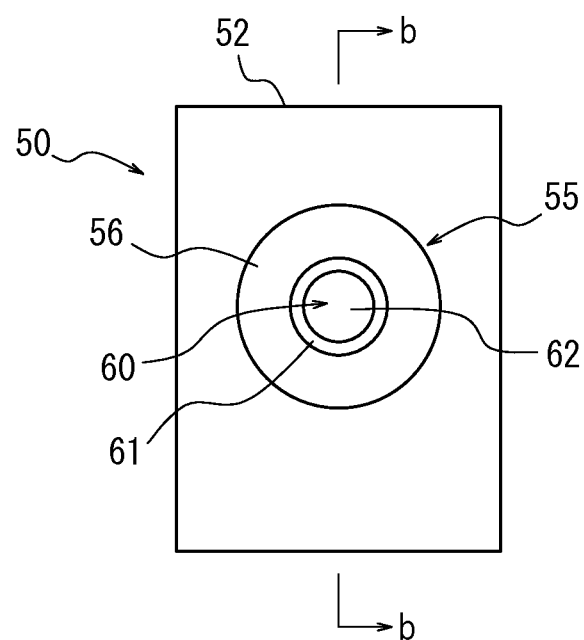
FIGS. 14A and 14B are partial detail diagrams of a measuring apparatus according to a fourth embodiment.
Figure 14B:
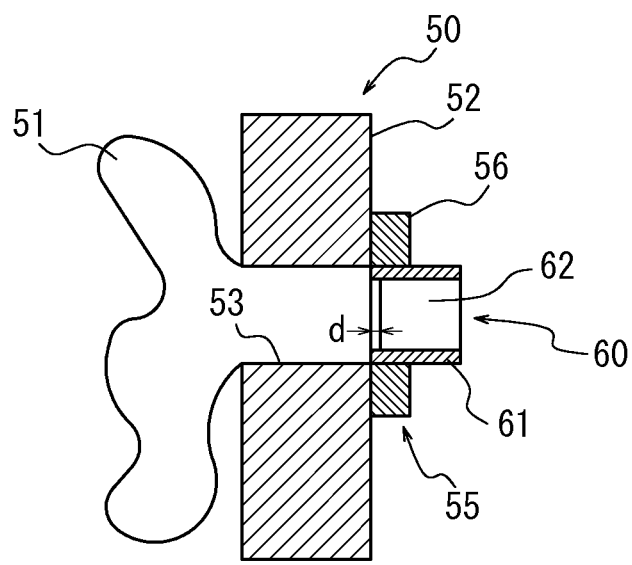

FIG. 14A is a plan view of the ear simulator 50 viewing from the base 10 side. FIG. 14B is a cross-sectional view taken from the line b-b in FIG. 14A. The microphone 62 is, as in the case of the above-described embodiment, inserted into the tubular member 61 supported by the opening of the vibration detection element 56 and held thereby. In the present embodiment, as described later, when the ear simulator 50 is detached from the base 30 to detect the sound by vibration of the panel 102, the microphone 62 is disposed, to avoid detecting the vibration of the panel 102 as a noise when the microphone 62 comes into contact therewith, so that, when the microphone 62 is mounted on the ear simulator 50, the sound pressure detection face is apart from the end face of the artificial ear canal unit 52 by a predetermined distance d. Here, the predetermined distance d is set so that the resonance frequency in the space of distance d, for example, is outside the measured frequency range (e.g. 10 kHz or more) of the panel 102.

In the measuring apparatus 10 according to the present embodiment, the vibration detection unit 55 and the sound pressure measuring unit 60 are integrated, thus it is detachable relative to the ear simulator 50. Therefore, as illustrated in FIG. 1, the ear simulator 50, the vibration detection unit 55 and the sound pressure measuring unit 60 are integrated and the integrated body is supported by the base 30 through the supporters 54, thereby allowing a measurement of the sound based on the vibration of the panel 102 through the ear simulator 50.

That is, in the indirect measurement mode in which the sound is measured through the ear simulator 50 in FIG. 1, the measuring unit 200 can detect, based on the output from the vibration detection unit 55, the vibration amount transmitted through the ear canal unit 52 when the panel 102 is pressed to the ear simulator 50 and vibrated. Thus, the vibration of the panel 102 directly shakes the inner ear, and the vibration amount corresponding to the bone conduction component heard not through the tympanic membrane, that is, the vibration amount weighted with the characteristics of vibration transmission to the human ear is detected. Also, at the same time, by the measuring unit 200, based on the output from the sound pressure measuring unit 60, the sound pressure corresponding to the air conduction component that is heard directly via the tympanic membrane when the air is vibrated by the vibration of the panel 102, and the sound pressure corresponding to the air conduction component, which is the sound generated by the ear itself with inside the ear canal being vibrated by the vibration of the panel 102, heard via the tympanic membrane, that is, the sound pressure weighted with the characteristics of sound pressure transmission to the human ear, are measured.

Figure 15:
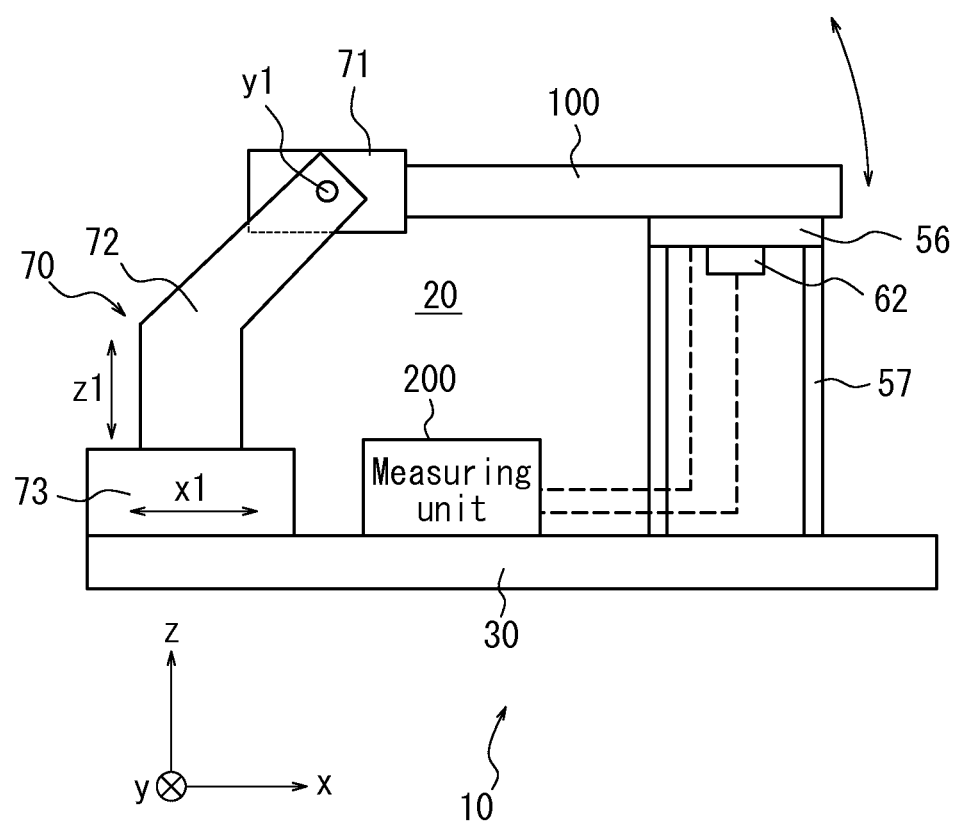
FIG. 15 is a diagram illustrating a schematic configuration in a direct measurement mode by the measuring apparatus according to the fourth embodiment.

As illustrated in FIG. 15, the ear simulator 50 is detached from the vibration detection unit 55 and the sound pressure measuring unit 60, and the vibration detection unit 55 and the sound pressure measuring unit 60 are supported by the base 30 through the supporters 57, thereby allowing a direct measurement of the sound based on the vibration of the panel 102, not through the ear simulator 50. That is, in the direct measurement mode in which the ear simulator 50 is detached as illustrated in FIG. 15, the measuring unit 200 can detect, based on the output from the vibration detection unit 55, the vibration amount when the panel 102 is directly pressed to the vibration detection unit 55 and is vibrated, thereby allowing a detection of the vibration amount of the panel 102 not weighted with the characteristics of vibration transmission to the human ear. Also at the same time, the measuring unit 200 measures, based on the output from the sound pressure measuring unit 60, the sound pressure by vibration of the panel 102 not weighted with the characteristics of sound pressure transmission to the human ear.

Note that, in the direct measurement mode illustrated in FIG. 15, an adhesive sheet may be provided between the panel 102 and the vibration detection unit 55 to allow reliable transmission of vibration of the panel 102 to the vibration detection unit 55. Furthermore, when the panel 102 is vibrated by the most vibrant part, that is, for example, a piezoelectric element, the portion of the panel where the piezoelectric element is located is pressed to the vibration detection unit 55. Moreover, in the direct measurement mode illustrated in FIG. 15, in the measuring unit 200, the sensitivity of vibration detected by the vibration detection unit 55 may be adjusted to the mechanical impedance level of the artificial mastoid conforming to IEC60318-6, and the vibration amount weighted with the characteristics of human body when the panel 102 is pressed to the mastoid behind the human ear may be detected.

Figure 16:
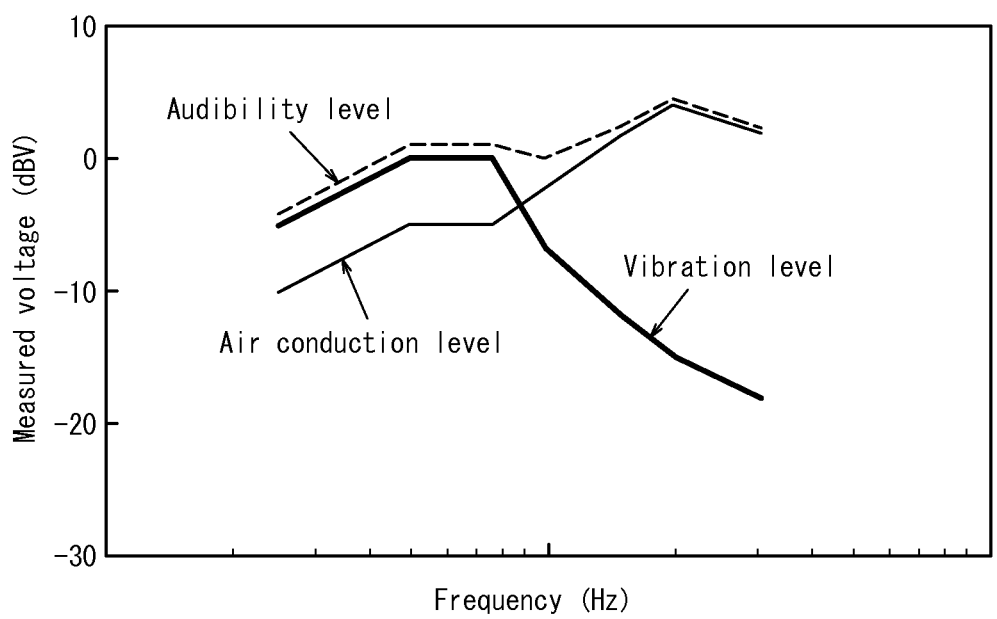
FIG. 16 is a diagram illustrating a measurement result in an indirect measurement mode by the measuring apparatus according to the fourth embodiment.
Figure 17:
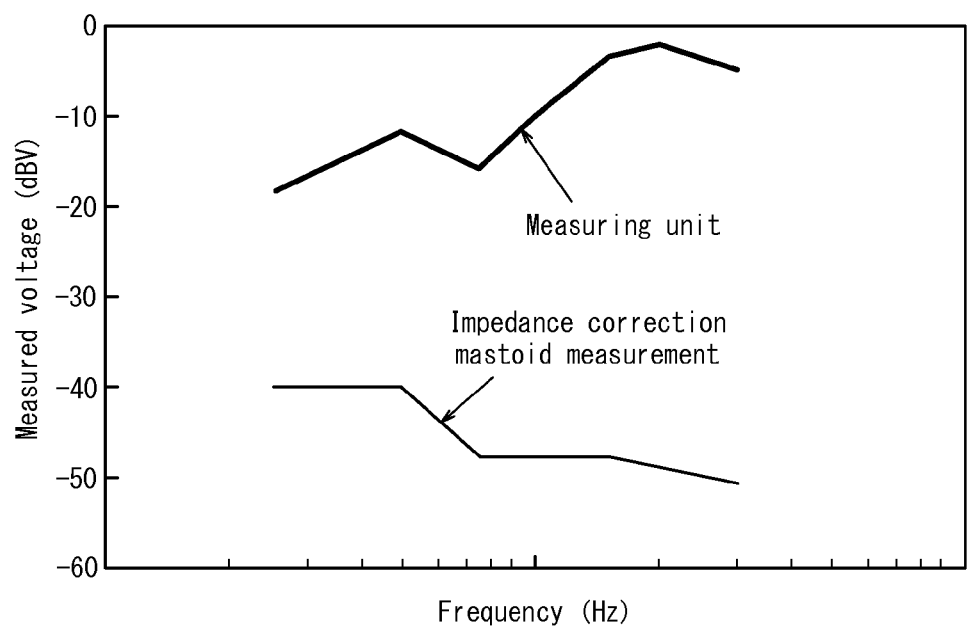
FIG. 17 is a diagram illustrating a measurement result in a direct measurement mode by the measuring apparatus according to the fourth embodiment.

FIGS. 16 and 17 illustrate an example of the measurement result by the measuring apparatus 10 according to the present embodiment. FIG. 16 illustrates the measurement result by the indirect measurement mode in FIG. 1, and FIG. 17 illustrates the measurement result by the direct measurement mode in FIG. 15. In FIGS. 16 and 17, the horizontal axis represents the acoustic frequency (Hz) and the longitudinal axis represents the measured voltage (dBV). In FIG. 16, the thick line represents the vibration level, the thin line represents the sound pressure level, and the dashed line represents the audibility level, which is a synthesis of the vibration level and the sound pressure level. Then, in FIG. 17, the thick line represents the vibration level by the direct measurement and the thin line represents the vibration level according to the impedance correction mastoid method by which the sensitivity of the vibration detected by the vibration detection unit 55 is adjusted to the mechanical impedance level of the artificial mastoid and is measured. This corresponds to the vibration level according to conventional mastoid method.

As obvious from FIGS. 16 and 17, according to the measuring apparatus 10 of the present embodiment, the vibration level measured by the indirect measurement mode is, compared with the impedance correction mastoid method corresponding to the conventional artificial mastoid method measured by the direct measurement mode, larger than the measurement level by the impedance correction mastoid method. Furthermore, the vibration level measured by the indirect measurement mode is, compared with the vibration level by the direct measurement mode, smaller than the vibration level by the direct measurement mode. That is, the vibration level measured by the indirect measurement mode is weighted with the characteristics of vibration transmission to the human ear.

Thus, according to the measuring apparatus 10 of the present embodiment, the vibration level by the indirect measurement mode weighted with the characteristics of vibration transmission to the human ear and the vibration level by the direct measurement mode not weighted with the characteristics of vibration transmission to the human ear can be selectively measured. Therefore, vibration levels of both of them are compared to confirm the relevancy, thereby allowing a more correct evaluation of the electronic device 100. Moreover, in the indirect measurement mode, the sound pressure through the artificial ear canal 53 can be measured simultaneously with the vibration level, thus the audibility level, which is a synthesis of the vibration level corresponding to the vibration transmission amount to the human ear and the sound pressure level corresponding to the air conduction sound, can be measured. Thereby, a more detailed evaluation of the electronic device 100 is allowed. Furthermore, a pressing force to the ear simulator 50 and to the vibration detection unit 55 of the electronic device 100 can be changed and the contact posture can be changed as well, thereby allowing an evaluation of the electronic device 100 in various aspects.

Fifth Embodiment

Figure 18A:
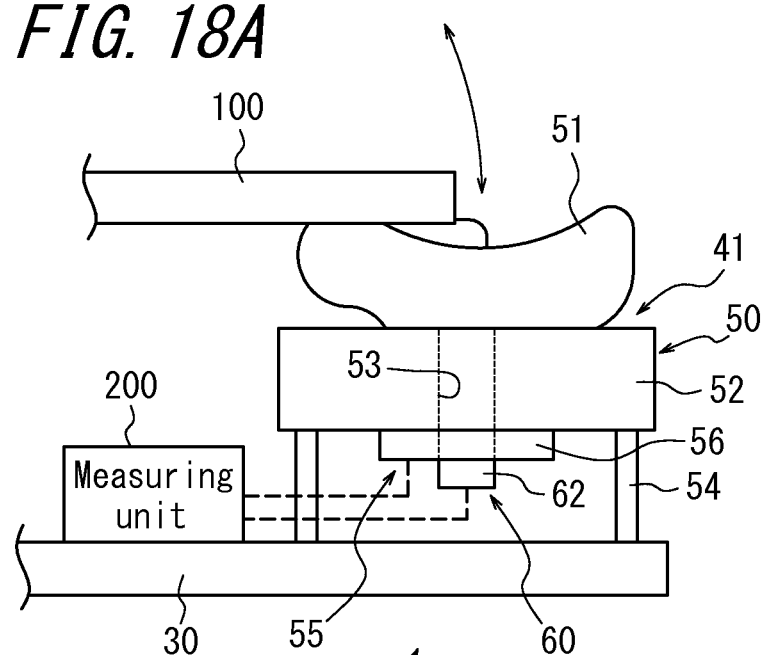
FIGS. 18A and 18B are diagrams illustrating a schematic configuration of a measuring apparatus according to a fifth embodiment.
Figure 18B:
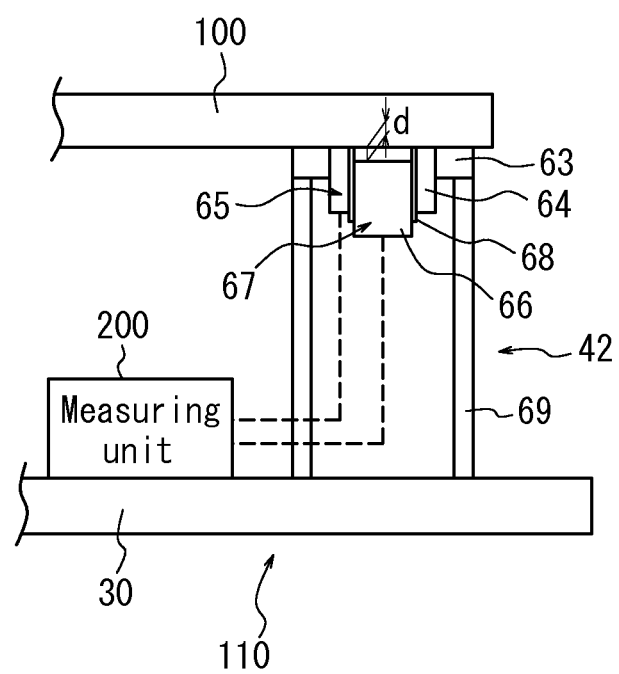

FIGS. 18A and 18B are diagrams illustrating a schematic configuration of a measuring apparatus according to the fifth embodiment of the present embodiment. In the measuring apparatus 10 according to the present embodiment, the measuring head 41 illustrated in FIG. 18A and the measuring head 42 illustrated in FIG. 18B are replaceably attached to the base 30. The measuring head 41 illustrated in FIG. 18A includes an ear simulator 50 having an ear model 51 and an artificial ear canal unit 52 illustrated in FIG. 1, a vibration detection unit 55 having a vibration detection element 56, a sound pressure measuring unit 60 having a microphone 62, a tubular member 61 and a supporters 54. To the ear simulator 50, as in the case of the disposition illustrated in FIG. 1, the vibration detection unit 55 and the sound pressure measuring unit 60 are connected and one end of the supporter 54 is connected as well. Then, with respect to the measuring head 41, the other end of the supporter 54 is detachably attached to the base 30.

Furthermore, the measuring head 42 illustrated in FIG. 18B includes a holding member 63, a vibration detection unit 65 having a ring-shaped vibration detection element 64 configured using a vibration pickup such as a piezoelectric type accelerometer pickup and the like, a sound pressure measuring unit 67 having a microphone 66 such as a condenser microphone and the like, a tubular member 68 and a supporter 69. The vibration detection element 64 is held by the inner periphery of the opening formed in the middle of the holding member 63, so that the detection face is almost aligned with the upper surface of the holding member 63. The microphone 66 is, at the opening of the holding member 63, inserted into the tubular member 68 supported by the opening of the ring-shaped vibration detection element 56 and held thereby. Note that, the microphone 66 is, as in the case of the microphone 62 of the measuring head 41, disposed so that the sound pressure detection face is apart from the upper surface of the vibration detection element 64 by a predetermined distance d. Moreover, one end of the supporter 69 is connected to the periphery of the holding member 63. Then, for the measuring head 42, the other end of the supporter 69 is detachably attached to the base 30.

That is, in the measuring apparatus 10 according to the present embodiment, the measuring heads 41 and 42 are replaceably attached to the base 30, thereby allowing detachment of the ear simulator 50 from the base 30. Note that, in the present embodiment, the vibration detection unit 55, the sound pressure measuring unit 60, the vibration detection unit 63 and the sound pressure measuring unit 65 correspond respectively to the first vibration detection unit, the first sound pressure measuring unit, the second vibration detection unit and the second sound pressure measuring unit. Other than that, the configuration is the same as that of the above-described embodiment.

According to the measuring apparatus 10 of the present embodiment, the measuring head 41 is attached to the base 30, thereby, in the indirect measurement mode as in the case illustrated in FIG. 1, when the panel 102 is pressed to the ear simulator 50 and vibrated, based on the output from the vibration detection unit 55, the vibration amount weighted with the characteristics of vibration transmission to the human ear is detected by the measuring unit 200. At the same time, based on the output from the sound pressure measuring unit 60, the sound pressure weighted with the characteristics of sound pressure transmission to the human ear is measured.

Furthermore, the measuring head 42 is attached to the base 30, thereby, in the direct measurement mode as in the case illustrated in FIG. 15, when the panel 102 is pressed to the ear simulator 50 and vibrated, based on the output from the vibration detection unit 63, the vibration amount of the panel 102 not weighted with the characteristics of vibration transmission to the human ear is detected by the measuring unit 200. At the same time, based on the output from the sound pressure measuring unit 65, the sound pressure by the vibration of panel 102 not weighted with the characteristics of the sound pressure transmission to the human ear is measured.

Therefore, also in the measuring apparatus 10 according to the present embodiment, the same effect as that of the above-described embodiment can be obtained. In particular, in the present embodiment, the indirect measurement mode and the direct measurement mode can be switched by replacing the measuring head 41 with the measuring head 42 with respect to the base 30, thereby providing an advantage in that a measurement mode can be switched easily and reliably.

Sixth Embodiment

Figure 19:
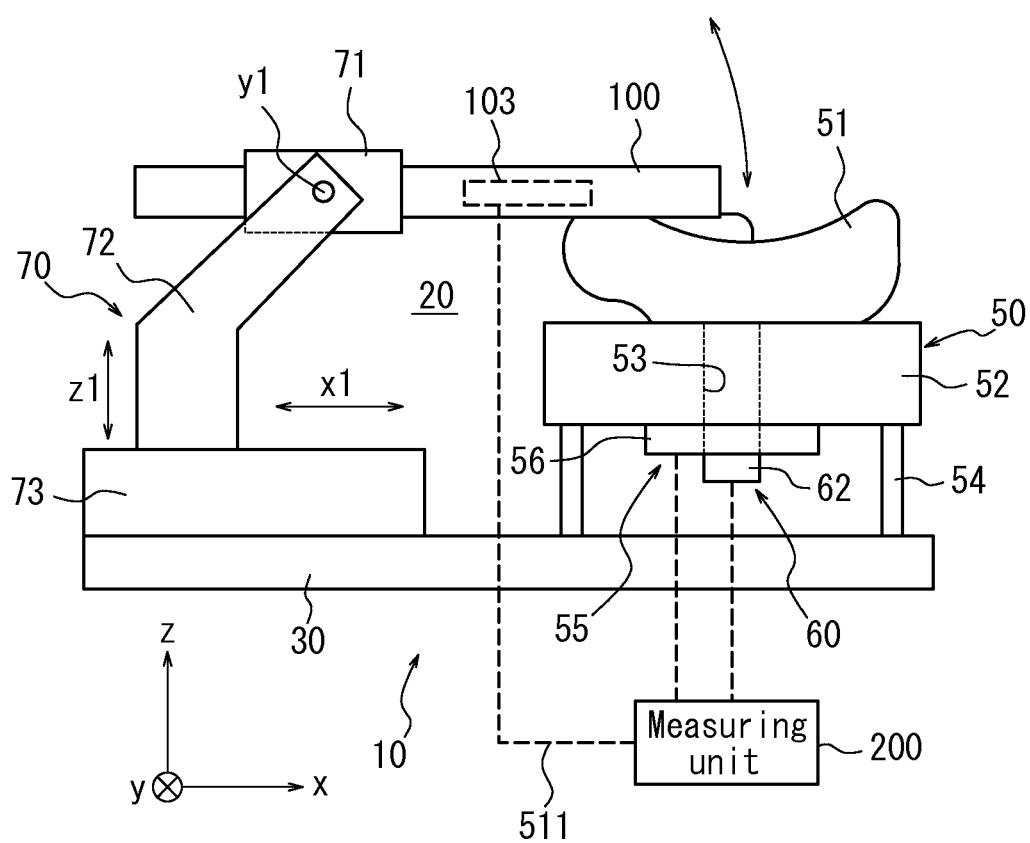
FIG. 19 is a drawing illustrating a schematic configuration of a measuring system according to a sixth embodiment.
Figure 20:
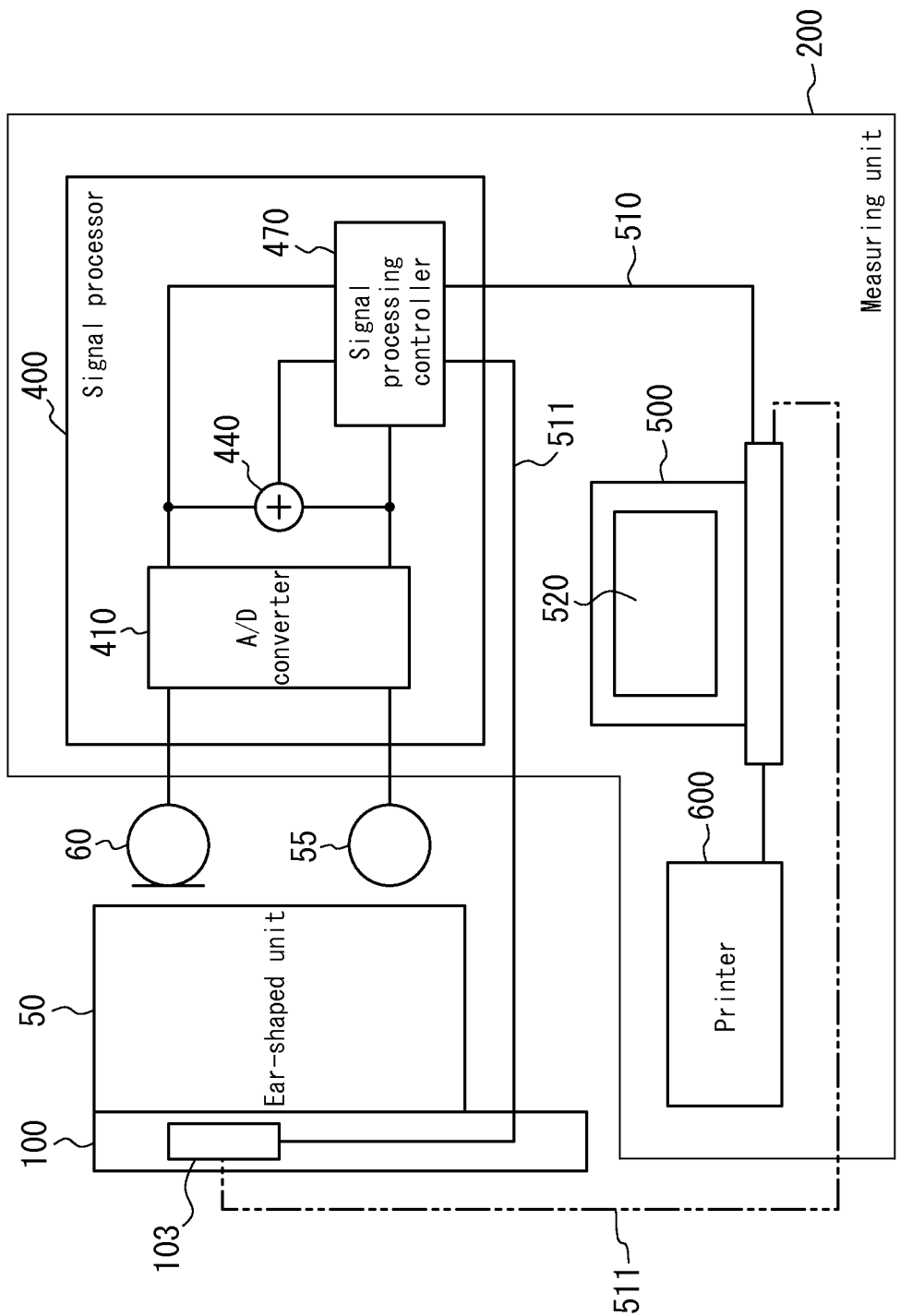
FIG. 20 is a functional block diagram of main parts of the measuring system in FIG. 19.

Next, a measuring system according to the sixth embodiment of the present invention is described. In the measuring system according to the sixth embodiment, as illustrated in FIG. 19, in the above-described embodiment, a built-in memory 103 of the electronic device 100 to be measured and the measuring unit 200 are connected. Furthermore, in the measuring unit 200, as illustrated in FIG. 20, the signal processor 400 is configured using the above-described A/D converter 410, the output synthesizing unit 440 and the signal processing controller 470.

In the measuring system according to the present embodiment, the sound source information corresponding to the reproduction sound source format that vibrates the panel 102 is downloaded via, for example, a recording medium or a network and stored in the built-in memory 103 of the electronic device 100 to be measured. Here, the sound source information is the test sound information for evaluating the electronic device 100, and is stored depending on the electronic device 100. For example, when the electronic device 100 is a mobile phone, the information can be the test sound (non-conversational false signals, pink noise, white noise, pseudo noise, multi-sine waves, sine waves, artificial sound) used for measuring the acoustic characteristics defined by 3GPP (3GPP TS26.131/132). Note that the sound source information may be stored as the test sound information or as an application that produces the test sound information. Also, the measuring apparatus may include a storage for the sound source information.

Moreover, the electronic device 100 is connected to the measuring unit 200 through a connection cable 511 for interface such as USB, so that it can be controlled by the measuring unit 200. Note that, for the connection between the electronic device 100 and the measuring unit 200 through the connection cable 511, as illustrated in FIG. 20 with a solid line, the electronic device 100 and the signal processing controller 470 of the signal processor 400 may be connected, or, as illustrated in FIG. 20 with a phantom line, the electronic device 100 and PC500 may be connected.

The measuring system according to the present embodiment controls the electronic device 100 to be measured by the measuring unit 200. That is, the electronic device 100 is controlled by the signal processing controller 470 of the signal processor 400 in synchronization with reception of a measure start command from PC500. Alternatively, the electronic device 100 is directly controlled by PC500 in synchronization with transmission of a measure start command to the signal processor 400. Thus, the predetermined sound source information stored in the built-in memory 103 is read out, and based on the read out sound source information, the panel 102 is vibrated. Also, the signal processor 400 starts the output processing of the vibration detection unit 55 and the sound pressure measuring unit 60 in synchronization with the vibration of the panel 102, and measures the bone conduction sound and the air conduction sound transmitted through the ear simulator 50. The measurement results are displayed on the display 520 and are output to the printer 600 as necessary, for an evaluation of the electronic device 100.

Thus, in the measuring system according to the present embodiment, the sound source information is stored in the built-in memory 103 of the electronic device 100 to be measured, the electronic device 100 is controlled by the measuring unit 200 of the measuring apparatus 10 and the panel 102 of the electronic device 100 is vibrated by the sound source information stored in the built-in memory 103. Then, in synchronization with the vibration of the panel 102, the bone conduction sound and the air conduction sound transmitted through the ear simulator 50 are measured by the measuring unit 200 based on the outputs from the vibration detection unit 55 and the sound pressure measuring unit 60, then based on the measurement result thereof, the electronic device 100 is evaluated. Therefore, the electronic device 100 can be vibrated by the desired sound source information, thereby allowing a correct evaluation of the electronic device 100 and an easy management of specification of the electronic device 100. Furthermore, the impulse response characteristics and the like in synchronization with start of the vibration of the panel 102 can be measured, thereby allowing a more detailed evaluation.

Moreover, the vibration level weighted with the characteristics of vibration transmission to the human ear through the ear simulator 50 can be measured by the vibration detection unit 55, thereby allowing a more correct evaluation of the electronic device 100. Also, the sound pressure level through the artificial ear canal 53 of the ear simulator 50 can be measured by the sound pressure measuring unit 60 simultaneously with the measurement of the vibration level. Thus, the audibility level, which is a synthesis of the vibration level corresponding to the vibration transmission amount to the human ear and the sound pressure level corresponding to the air-transmission sound, can be measured, thereby allowing a more detailed evaluation of the electronic device 100. Furthermore, the holder 70 can change the pressing force of the electronic device 100 to the ear simulator 50 and the contact posture as well, thereby allowing an evaluation of the electronic device 100 in various aspects.

Seventh Embodiment

Figure 21:
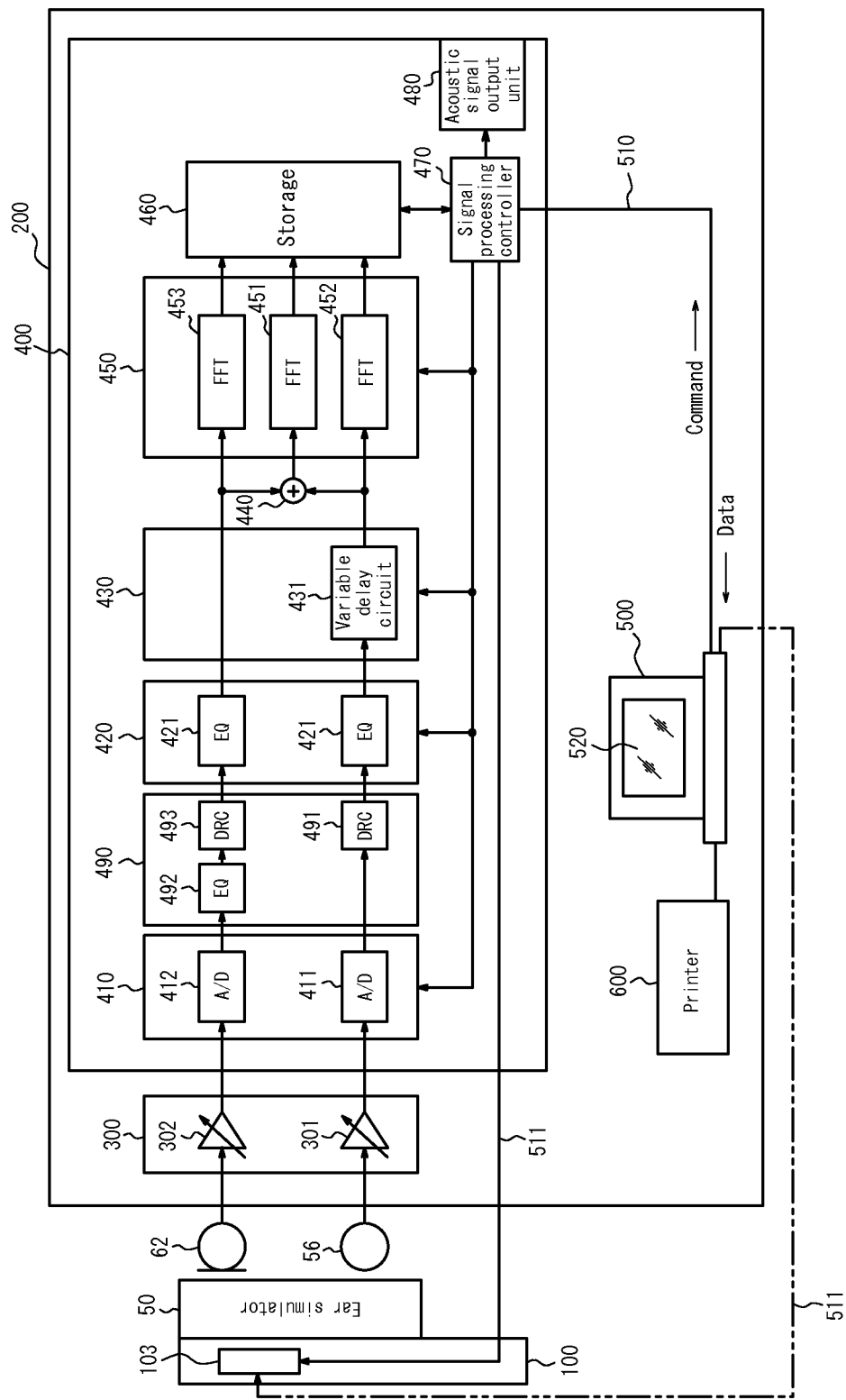
FIG. 21 is a functional block diagram of main parts of a measuring system according to a seventh embodiment.

Next, a measuring apparatus according to the seventh embodiment of the present invention is described. In the measuring apparatus according to the seventh embodiment, the configuration of the measuring unit 200 is different from the sixth embodiment. That is, as illustrated in FIG. 21, the measuring unit 200 includes a sensitivity adjusting unit 300, a signal processor 400, a PC (personal computer) 500 and a printer 600. Then, the signal processor 400 includes an A/D converter 410, an audibility reproduction unit 490, a frequency characteristic adjusting unit 420, a phase adjusting unit 430, an output synthesizing unit 440, a frequency analysis unit 450, a storage 460, an acoustic signal output unit 480 and a signal processing controller 470. The sensitivity adjusting unit 300, the A/D converter 410, the frequency characteristic adjusting unit 420, the phase adjusting unit 430, the output synthesizing unit 440, the frequency analysis unit 450, the storage 460 and the signal processing controller 470 are configured respectively in the same manner as their corresponding components in FIG. 7. Moreover, the acoustic signal output unit 480 is configured in the same manner as its corresponding component in FIG. 12.

In the present embodiment, the output from the A/D converter 410 is supplied to the audibility reproduction unit 490. The audibility reproduction unit 490 sets a decline in audibility of the user and reproduces the audibility of the user. Here, the following two factors are known as factors that decline audibility of a human;

(1) Conductive hearing loss in which, a tympanic membrane becomes difficult to move, which makes malleus, incus and stapes in the middle ear connecting to the auditory nerves adhered to each other and thus they become difficult to move, causing difficulty in hearing, especially a high frequency sound: and (2) Sensorineural hearing loss in which, due to damage to the auditory nerve, a recruitment phenomenon, in which people may have difficulty in hearing the sound up to a certain sound pressure, and can hear the sound suddenly when the sound exceeds a certain sound pressure, then more than the certain sound pressure, the sound resonates in the ear, may occur.

In general, the decline in the audibility is a sum of decline by a conductive hearing loss and decline by a sensorineural hearing loss. Therefore, for example, people whose decline in audibility is caused mainly by a conductive hearing loss can hear a vibration transmission component of a piezoelectric receiver without difficulty. However, people whose decline in audibility is caused mainly by a sensorineural hearing loss may have difficulty in hearing both the air conduction component and the vibration transmission component. That is, for people having almost the same level of declined audibility, one may not require an increase in the volume of the piezoelectric receiver due to a balance between a conductive hearing loss and a sensorineural hearing loss. Therefore, in the electronic device such as a piezoelectric receiver and the like that transmits sound by a component of vibration, it is preferred that such electronic device may have characteristics in consideration of conductive hearing loss level and sensorineural hearing loss level.

Thus, in the present embodiment, the audibility reproduction unit 490 includes a DRC (Dynamic Range Compression) 491, which is a first compression/expansion processor that performs compression/expansion processing of the output from the A/D converting circuit 411, an equalizer (EQ) 492, which is an attenuation processor that performs attenuation processing of the output from the A/D converting circuit 412 and a DRC 493, which is a second compression/expansion processor that performs compression/expansion processing of the output from the EQ 492. Here, DRC 491 and DRC 493 reproduce a sensorineural hearing loss of the user. Then, the equalizer 492 reproduces a conductive hearing loss of the user. Note that, it is preferred that DRC 491 and DRC 493 be configured as a multichannel that can compress/expand the input signal for every frequency band and thus adjust the dynamic range. Furthermore, it is preferred that the equalizer 492 be configured using a graphical equalizer that can attenuate the input signal for every frequency band, for example, by greater than 30 dB. Reproduction of audibility by setting a conductive hearing loss and a sensorineural hearing loss by the audibility reproduction unit 490, depending on the user, will be described later. The output from the audibility reproduction unit 490 is supplied to the frequency characteristic adjusting unit 420 and then is processed in the same manner as illustrated in FIG. 7.

Next, the measuring method of the electronic device 100 of the measuring apparatus according to the present embodiment is described. First, before the electronic device 100 is measured, the audibility reproduction unit 490 of the measuring apparatus is set depending on conductive hearing loss and sensorineural hearing loss of the user, and the audibility of the user is reproduced. Here, conductive hearing loss and sensorineural hearing loss of the user by the audibility reproduction unit 490 can be set based on, for example, the measurement result of audibility by an audiometer (audiogram).

That is, the measured value of the audibility of air conduction by the audiometer is a measured value in consideration of all elements, such as outer, middle and inner ears. On the other hand, the measured value of the audibility of boner conduction by the audiometer is a measured value in consideration only of the element of inner ear. Therefore, based on the difference between the bone conduction value and the air conduction value by the audiogram, conductive hearing loss and sensorineural hearing loss can be set. For example, when the air conduction level and the bone conduction level of the audiogram are the same, an inner ear is a main cause of the difficulty in hearing, and thus it is determined as a sensorineural hearing loss. Therefore, in this case, a sensorineural hearing loss is reproduced by DRC 491 on the vibration detection element 56 side and DRC 493 on the microphone 62 side.

On the other hand, when the air conduction level and the bone conduction level of the audiogram are not the same, both middle and inner ears may be a factor of the difficulty in hearing. In this case, "air conduction level-bone conduction level" corresponds to the conductive hearing loss occurred in the middle ear, and the bone conduction level corresponds to the sensorineural hearing loss occurred in the inner ear. Therefore, in this case, the conductive hearing loss is reproduced by the equalizer 492 on the microphone 62 side and the sensorineural hearing loss is reproduced by DRC 491 on the vibration detection element 56 side and DRC 493 on the microphone 62 side.

Figure 22A:
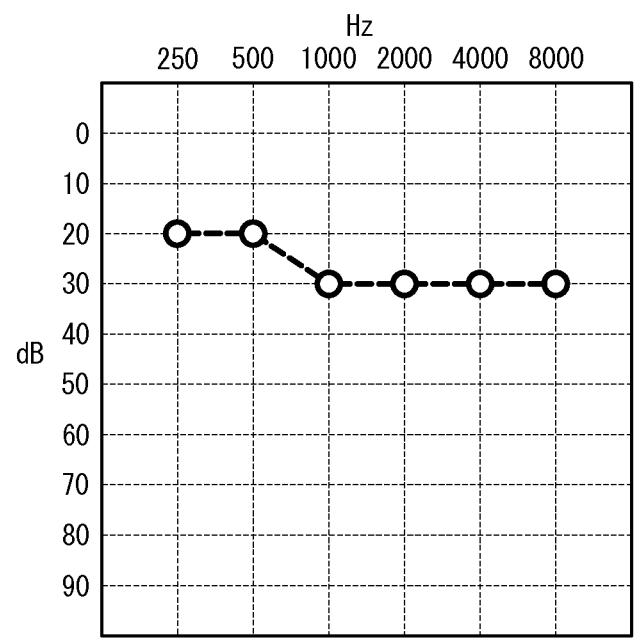
FIGS. 22A and 22B are diagrams illustrating an example of audiogram of air conduction component and vibration component.
Figure 22B:
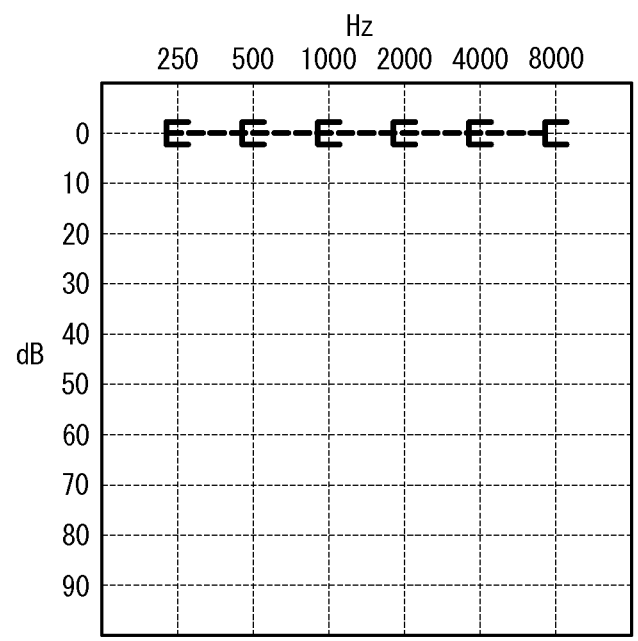
Figure 23:
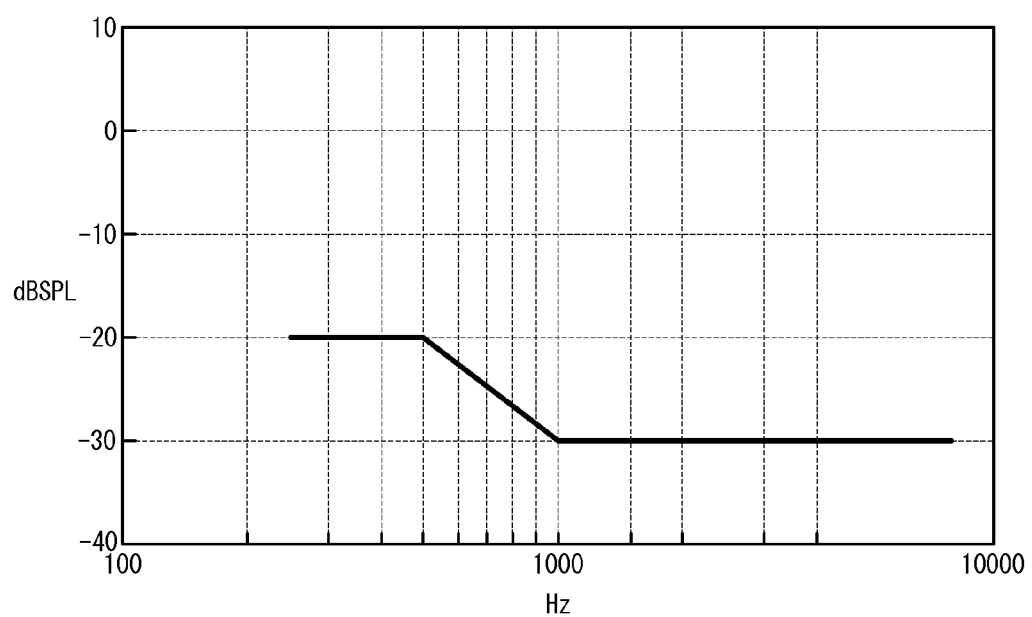
FIG. 23 is a diagram illustrating an example of frequency characteristics of an equalizer that reproduces a conductive hearing loss in an audibility reproduction unit in FIG. 21.

For example, assuming that, as an audiogram of the user, the measurement result of the audibility of the air conduction component illustrated in FIG. 22A and that of the bone conduction component illustrated in FIG. 22B are obtained. In this case, for the bone conduction component in FIG. 22B, the audibility level is 0 dB, which is normal, and there is a decline in audibility only for the air conduction component in FIG. 22A, which suggests that a conductive hearing loss occurs from the outer ear to the middle ear. Therefore, in this case, the frequency characteristics of the equalizer 492 on the microphone 62 side are set as illustrated in FIG. 23 to reproduce a conductive hearing loss, thereby allowing reproduction of the audibility of the user. Note that a conductive hearing loss can also be set based on the data of difficulty in hearing caused by the aging in general. In this case, the data corresponding to age set for the equalizer 492 may be stored, as a table, in PC 500 and the like, and by input of the age of the user, the characteristics of the equalizer 492 may be set based on the corresponding data that has been set.

Figure 24:
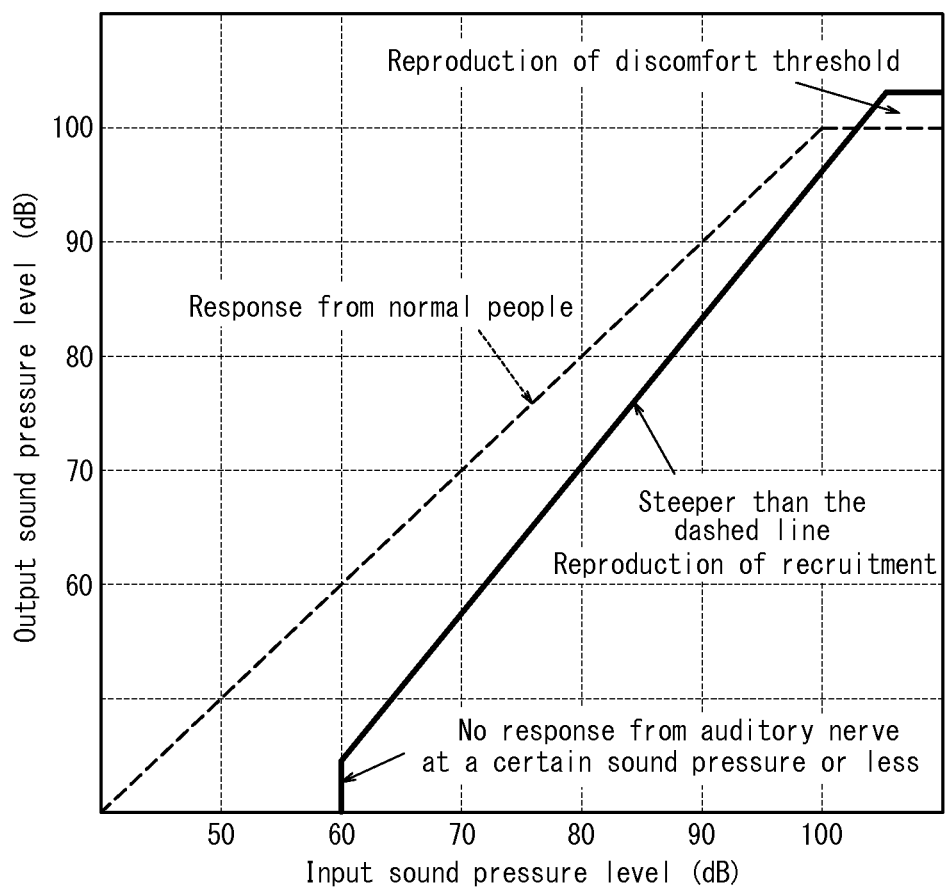
FIG. 24 is a diagram illustrating an example of input/output characteristics of DRC that represents a sensorineural hearing loss in the audibility reproduction unit in FIG. 21.

Furthermore, the sensorineural hearing loss is reproduced by setting the input/output characteristics of DRC 491 and DRC 493 as illustrated in FIG. 24, for example. Note that, the input/output characteristics illustrated in FIG. 24 reproduce a recruitment phenomenon in which, for the sound of 60 dB or less, the auditory nerve does not respond and thus the sound cannot be heard at all, for the sound of 60 dB or greater, the change in 10 dB is perceived as greater than 10 dB, and for the sound greater than 100 dB, there is an discomfort threshold that causes saturation. Note that, not all of the studies of the recruitment phenomenon have been revealed yet. However, a discomfort threshold can be calculated based on, for example, the minimum audible threshold, by the formula such as FIG. 6, NAL-NL1 and the like (relationship between the audibility level and the audible zone value and the relationship between the audibility level and the discomfort threshold value). In FIG. 24, input/output characteristics of DRC 491 and DRC 493 are set based on the minimum audible threshold of 60 dB.

As described above, when the audibility reproduction unit 490 is set depending on the audibility of the user, a measurement of the electronic device 100 is started. First, the electronic device 100 is controlled by the signal processing controller 470 of the signal processor 400 in synchronization with reception of a start measure command from PC 500. Alternatively, the electronic device 100 is directly controlled by PC 500 in synchronization with transmission of a measure start command to the signal processor 400. Thus, the predetermined sound source information stored in the built-in memory 103 is read out, and based on the read out sound source information, the panel 102 is vibrated. Furthermore, the signal processor 400 starts processing the outputs from the vibration detection element 56 and the microphone 62 in synchronization with the vibration of the panel 102, and measures the bone conduction sound and the air conduction sound transmitted through the ear simulator 50. The measurement result is displayed on the display 520, output to the printer 600 as necessary, and provided for an adjustment of the electronic device 100.

Thus, the measuring apparatus according to the present embodiment can measure the electronic device 100 by reproducing the audibility by the audibility reproduction unit 490 in consideration of a conductive hearing loss and a sensorineural hearing loss of the user. Therefore, the electronic device 100 can be adjusted to the characteristics suitable for the user. Also, in the present embodiment, the electronic device 100 is controlled by the measuring unit 200 of the measuring apparatus, the panel 102 of the electronic device 100 is vibrated by the sound source information stored in the built-in memory 103, and in synchronization with the vibration of the panel 102, the electronic device 100 is measured by the measuring unit 200. Therefore, the electronic device 100 can be vibrated by the desired sound source information, thereby allowing an adjustment of the characteristics of the electronic device 100 more suitable for the user's audibility.

Moreover, by the vibration detection element 56, the bone conduction sound weighted with the characteristics of vibration transmission to the human ear can be measured through the ear simulator 50, thereby allowing a more correct measurement of the electronic device 100. Also, simultaneously with the bone conduction sound, the air conduction sound through the artificial ear canal 53 of the ear simulator 50 can be measured by the microphone 62. Thus, a synthesized sound of the bone conduction sound and the air conduction sound corresponding to the vibration transmission amount to the human ear can be measured, thereby allowing a more detailed adjustment of the electronic device 100. Furthermore, the holder 70 can change the pressing force to the ear simulator 50 of the electronic device 100 and can change the contact posture as well, thereby allowing a measurement of the electronic device 100 in various aspects.

Eighth Embodiment

Figure 25:
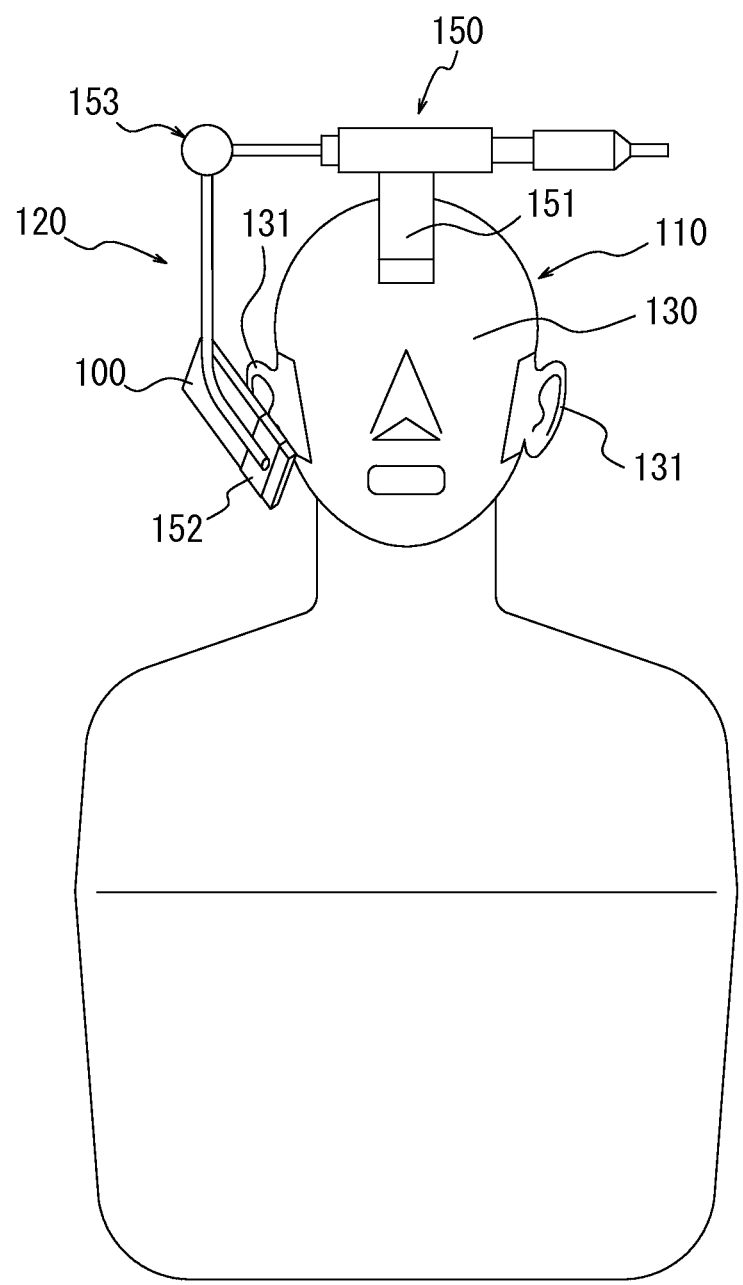
FIG. 25 is a diagram illustrating a schematic configuration of main parts of a measuring apparatus according to an eighth embodiment.

FIG. 25 is a diagram illustrating a schematic configuration of a measuring apparatus according to the eighth embodiment of the present invention. The measuring apparatus 110 according to the present embodiment includes a head model 130 of human body and a holder 150 that supports the electronic device 100 to be measured. The head model 130 is configured, for example, using HATS, KEMAR and the like. The artificial ear 131 of the head model 130 is detachably attached to the head model 130.

Figure 26A:
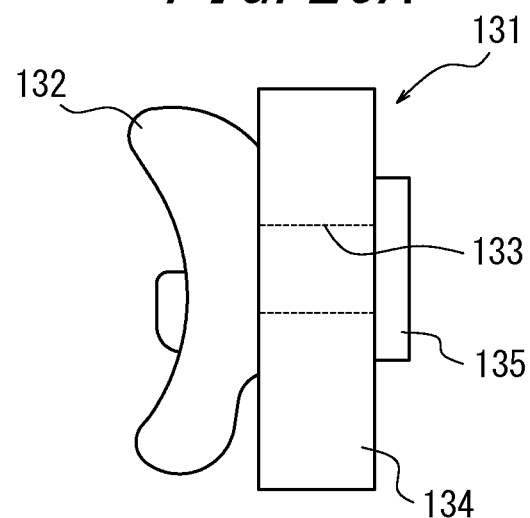
FIGS. 26A and 26B are partial detail diagrams of the measuring apparatus in FIG.
Figure 26B:
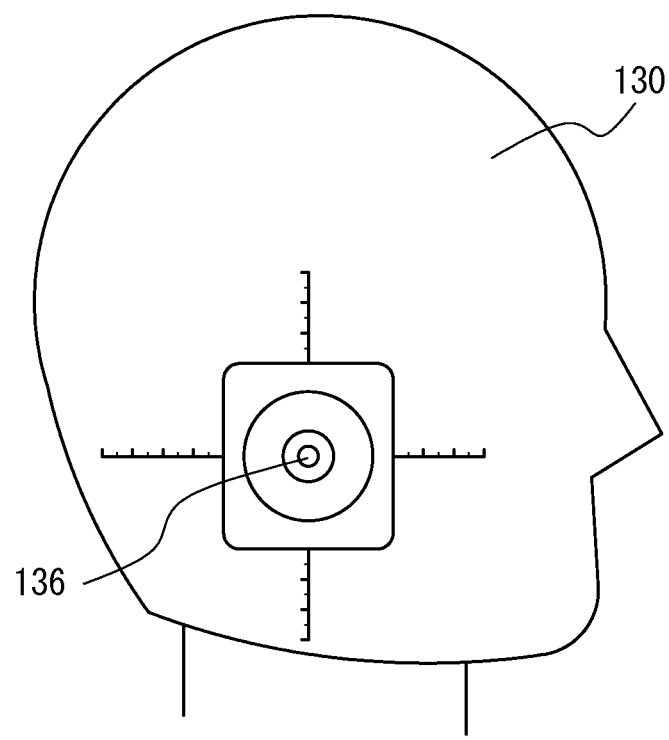

The artificial ear 131 includes, as illustrated as a side view in FIG. 26A where the artificial ear is detached from the head model 130, an ear model 132 similar to the ear simulator 50 of the first embodiment and an artificial ear canal unit 134 connected to the ear model 132 and in which the artificial ear canal 133 is formed. At the artificial ear canal unit 134, as in the case of the ear simulator 50 of the first embodiment, the vibration detection unit 135 having a vibration detection element is disposed on a periphery of the opening of the artificial ear canal 133. Also, at the mounting unit of the artificial ear 131 of the head model 130, as illustrated as a side view in FIG. 26B where the artificial ear 131 is detached, the sound pressure measuring unit 136 having a microphone is disposed in the middle thereof. The sound pressure measuring unit 136 is disposed so that it measures, when the artificial ear 131 is attached to the head model 130, the sound pressure of the sound propagated via the artificial ear canal 133 of the artificial ear 131. Note that, as in the case of the ear simulator 50 of the first embodiment, the sound pressure measuring unit 136 may be disposed on the artificial ear 131 side.

The holder 150 is detachably attached to the head model 130, and includes a head fixing unit 151 to the head model 130, a supporter 152 that supports the electronic device 100 to be measured and a multiple joint arm 153 that connects the head fixing unit 151 and the supporter 152. The holder 150 is configured so that it can adjust the pressing force and the contact posture of the electronic device 100 supported by the supporter 152 through the multi joint arm 153 to the artificial ear 131 as in the case of the holder 70 of the first embodiment.

According to the measuring apparatus 110 of the present embodiment, the same effect as the measuring apparatus of the first embodiment can be obtained. In particular, in the present embodiment, the artificial ear 131 for detecting a vibration is detachably attached to the head model 130 of human body to evaluate the electronic device 100, thereby allowing an evaluation based further on the actual embodiment in which the influence of the head is considered.

Note that the present invention is not limited to the above-described embodiments, and various modifications or changes can be made. For example, in the above-described embodiments, as an electronic device 100 to be measured, a mobile phone, such as a smart phone, whose panel 102 vibrates as a vibrator is assumed. However, an electronic device such as a folding handset having a panel in contact with the ear vibrates in the communication mode and the like can be evaluated as well in the same manner. Moreover, besides the mobile phones, other piezoelectric receivers can be evaluated in the same manner.

Also, in the above-described embodiments, in the phase adjusting unit 430, the phase of the signal detected by the vibration detection element 56 is delayed relative to the signal detected by the microphone 62. However, using a buffer such as FIFO and the like, the phase of the signal detected by the microphone 62 may be forwarded relative to the signal detected by the vibration detection element 56. Moreover, in the above described embodiments, in the measuring unit 200, PC500 is provided separating from the signal processor 400. However, the function of the evaluation application executed by PC500 may be mounted on the signal processing circuit 400, and PC 500 may be omitted. Furthermore, in FIG. 7, FFTs 452 and 453 may be omitted.

Also, the sensitivity adjusting unit, the signal processor, the A/D converter, the frequency characteristic adjusting unit, the phase adjusting unit, the output synthesizing unit, the frequency analysis unit, the storage, the signal processing controller, the display, the printer and the like of the above-described embodiments may communicate each other wired or wirelessly and transmit or receive signals each other. Then the measuring system according to the present invention is not limited to an independent type measuring apparatus into which all functions are integrated, and needless to say, the measuring system may be a measuring system that utilizes a network system and a cloud, as in the case where a sensitivity adjusting unit, a signal processor, a frequency analysis unit or a storage and the like are disposed separately in one or more PCs or external servers.

Furthermore, in the above-described embodiments, as a storage for the sound source information, a built-in memory 103 of the electronic device 100 to be measured is used, however, a storage for the sound source information may be provided on the measuring apparatus side. For example, in FIGS. 20 and 21, a built-in memory of the signal processor 400 or PC500 may be used, or a storage dedicated to the sound source information may be provided in the signal processor 400 or PC500, and predetermined sound source information may be read out from the corresponding built-in memory or storage by the signal processor 400 or PC500 and supplied to the electronic device 100, thereby vibrating the panel 102. Moreover, a storage dedicated to the sound source information may be provided on the measuring apparatus side, independently from the signal processor 400 and PC500.

Also, in the above-described embodiments, PC500 is provided in the measuring unit 200, separating from the signal processor 400. However, the function of the evaluation application executed by PC500 may be mounted on the signal processor 400, and PC500 may be omitted. Furthermore, needless to say, the measuring unit 200 is not limited to an independent type into which all functions are integrated, and may be configured utilizing a network system and a cloud, as in the case where functions are disposed separately in one or more PCs or external servers.

Also, in the above-described embodiments, the ear simulator 50, the vibration detection unit 55 and the sound pressure measuring unit 60 are provided. However, the ear simulator 50 and the sound pressure measuring unit 60 may be omitted in some measuring characteristics of the vibrator such as in the case where a direct vibration of a vibrator is measured in consideration only of a sensorineural hearing loss of the user.

REFERENCE SIGNS LIST

10 Measuring apparatus
30 Base
50 Ear simulator
51 Ear model
52 Artificial ear canal unit
53 Artificial ear canal
54 Supporter
55 Vibration detection unit
56 Vibration detection element
60 Sound pressure measuring unit
61 Tubular member
62 Microphone
70 Holder
71 Supporter
72 Arm
73 Move adjusting unit
75 Signal processor
76 Output unit
100 Electronic device
101 Housing
102 Panel (vibrator)
110 Measuring apparatus
130 Head model
131 Artificial ear
132 Ear model
133 Artificial ear canal
134 Artificial ear canal unit
135 Vibration detection unit
136 Sound pressure measuring unit
150 Holder
151 Head fixing unit
152 Supporter
153 Multi joint arm
200 Measuring unit
300 Sensitivity adjusting unit
400 Signal processor
410 A/D converter
420 Frequency characteristic adjusting unit
430 Phase adjusting unit
440 Output synthesizing unit
450 Frequency analysis unit
460 Storage
470 Signal processing controller
480 Acoustic signal output unit
490 Audibility reproduction unit
491, 493 DRC
492 Equalizer
500 PC
510, 511 Connection cable
520 Display
600 Printer

The invention claimed is:

1. A measuring apparatus configured to evaluate an electronic device that transmits sound to a user through vibration transmission by pressing a vibrator held in a housing to a human ear, comprising:
an ear simulator that mimics a human ear; and
a vibration detection unit disposed on a periphery of an artificial ear canal formed in the ear simulator, wherein the ear simulator includes an ear model and an artificial ear canal unit connected to the ear model,
the artificial ear canal is formed in the artificial ear canal unit, and
the ear simulator further includes a sound pressure measuring unit that measures sound pressure of sound propagated through the artificial ear canal.

2. The measuring apparatus according to claim 1, wherein the artificial ear canal has the length of 20 mm to 40 mm.

3. The measuring apparatus according to claim 1, further comprising a holder that holds the electronic device.

4. The measuring apparatus according to claim 3, wherein the holder includes a supporter that supports the electronic device in at least two positions to mimic a manner in which a person presses the electronic device to his/her ear.

5. The measuring apparatus according to claim 3, wherein the holder is configured to adjustably move the electronic device in a direction of pressing to the ear simulator.

6. The measuring apparatus according to claim 3, wherein the holder is configured to adjustably turn the electronic device in a direction of pressing to the ear simulator.

7. The measuring apparatus according to claim 5, wherein the holder is configured to adjust pressing force of the vibrator to the ear simulator in a range of 0 N to 10 N.

8. The measuring apparatus according to claim 5, wherein the holder is configured to adjust pressing force of the vibrator to the ear simulator in a range of 3 N to 8 N.

9. The measuring apparatus according to claim 3, wherein the holder is configured to adjustably move the electronic device in an up and down direction of the electronic device relative to the ear simulator, so that a contact posture of the electronic device to the ear simulator is changed.

10. The measuring apparatus according to claim 9, wherein the contact posture includes a posture in which the electronic device is in contact with the ear simulator so that the vibrator covers the ear simulator.

11. The measuring apparatus according to claim 9, wherein the contact posture includes a posture in which the electronic device is in contact with the ear simulator so that a part of the vibrator comes into contact with the ear simulator.

12. The measuring apparatus according to claim 1, wherein the ear simulator is made of a material conforming to IEC60318-7.

13. The measuring apparatus according to claim 1, wherein the vibration detection unit includes a plurality of vibration detection elements disposed on the periphery of the artificial ear canal.

14. The measuring apparatus according to claim 1, wherein the vibration detection unit includes two arc-like vibration detection elements disposed around the periphery of the artificial ear canal.

15. The measuring apparatus according to claim 1, wherein the vibration detection unit includes a ring-shaped vibration detection element disposed around the periphery of the artificial ear canal.

16. The measuring apparatus according to claim 1, wherein the sound pressure measuring unit includes a microphone held by a tubular member extending from an outer wall of the artificial ear canal.

17. The measuring apparatus according to claim 1, wherein the sound pressure measuring unit includes a microphone disposed in a floating state from the outer wall of the artificial ear canal.

18. A measuring method in which, in order to evaluate an electronic device that transmits sound to a user through vibration transmission by pressing a vibrator held in a housing to a human ear, including:
the vibrator being pressed to an ear simulator that mimics a human ear, and a vibration detection unit detecting vibration transmitted on a periphery of an artificial ear canal formed in the ear simulator through vibration of the vibrator, wherein the ear simulator includes an ear model and an artificial ear canal unit connected to the ear model, the artificial ear canal is formed in the artificial ear canal unit, and the ear simulator further includes a sound pressure measuring unit that measures sound pressure of sound propagated through the artificial ear canal.

\* \* \* \* \*